United States Patent
Lamming et al.

(10) Patent No.: US 7,409,434 B2
(45) Date of Patent: Aug. 5, 2008

(54) METHOD AND APPARATUS FOR CONTROLLING DOCUMENT SERVICE REQUESTS USING A MOBILE COMPUTING DEVICE

(75) Inventors: Michael G. Lamming, Cambridge (GB); Allan MacLean, Bottisham (GB); Anthony F. Frayling, Cambridge (GB)

(73) Assignee: Xerox Corporation, Norwalk, CT (US)

( * ) Notice: Subject to any disclaimer, the term of this patent is extended or adjusted under 35 U.S.C. 154(b) by 1383 days.

(21) Appl. No.: 09/682,488

(22) Filed: Sep. 7, 2001

(65) Prior Publication Data
US 2003/0050963 A1  Mar. 13, 2003

(51) Int. Cl.
*G06F 15/16* (2006.01)
*G06F 15/173* (2006.01)
*G06F 17/00* (2006.01)
*G06F 17/20* (2006.01)

(52) U.S. Cl. ............... 709/217; 709/206; 709/225; 715/200

(58) Field of Classification Search .......... 709/206, 709/217, 225; 715/500
See application file for complete search history.

(56) References Cited

U.S. PATENT DOCUMENTS

| | | | |
|---|---|---|---|
| 5,666,159 A | 9/1997 | Parulski et al. | |
| 5,862,321 A * | 1/1999 | Lamming et al. | 709/200 |
| 6,144,997 A | 11/2000 | Lamming et al. | 709/217 |
| 6,201,611 B1 * | 3/2001 | Carter et al. | 358/1.15 |
| 6,233,058 B1 * | 5/2001 | Park | 358/1.15 |
| 6,269,481 B1 | 7/2001 | Perlman et al. | |
| 6,311,180 B1 * | 10/2001 | Fogarty | 707/4 |
| 6,336,142 B1 * | 1/2002 | Kato et al. | 709/227 |
| 6,385,728 B1 | 5/2002 | DeBry | |
| 6,477,565 B1 * | 11/2002 | Daswani et al. | 709/217 |
| 6,493,028 B1 | 12/2002 | Anderson et al. | |

(Continued)

FOREIGN PATENT DOCUMENTS

EP  0 691 619 A2  6/1995

(Continued)

OTHER PUBLICATIONS

U.S. Appl. No. 09/270,451 (entitled "Mobile Email Document Transaction Service").

(Continued)

*Primary Examiner*—Ario Etienne
*Assistant Examiner*—Avi Gold
(74) *Attorney, Agent, or Firm*—Fay Sharpe LLP

(57) ABSTRACT

A document service request at a mobile computing device is carried out using at least two communications channels. The document service request includes a first parameter identifying a document accessible to a document server. Device information identifying a type of output device available over one of two communications channels is obtained at the mobile computing device and added as a second parameter to the document service request. The parameters of the document service request are transmitted from the mobile computing device to the document server over one of the two communications channels. The mobile computing device controls a connection between the document server and the output device by communicating with the document server over one of its communications channels and with the output device over the other of its communications channels to transmit therebetween the document in a format suitable for the output device.

26 Claims, 19 Drawing Sheets

U.S. PATENT DOCUMENTS

| | | |
|---|---|---|
| 6,493,551 B1 * | 12/2002 | Wang et al. ............... 455/432.1 |
| 6,553,240 B1 * | 4/2003 | Dervarics ................... 455/566 |
| 6,611,358 B1 * | 8/2003 | Narayanaswamy .......... 358/442 |
| 6,665,712 B2 | 12/2003 | Pickup |
| 6,694,354 B1 | 2/2004 | Elg |
| 6,701,378 B1 * | 3/2004 | Gilhuly et al. .............. 709/249 |
| 6,704,024 B2 * | 3/2004 | Robotham et al. .......... 345/581 |
| 6,738,841 B1 | 5/2004 | Wolff |
| 6,744,528 B2 | 6/2004 | Picoult et al. |
| 6,751,732 B2 | 6/2004 | Strobel et al. |
| 2001/0018330 A1 | 8/2001 | Yamauchi |
| 2001/0029531 A1 | 10/2001 | Ohta .......................... 709/223 |
| 2004/0122932 A1 | 6/2004 | Mickeleit ................... 709/223 |
| 2004/0139229 A1 | 7/2004 | Mickeleit ................... 709/245 |

FOREIGN PATENT DOCUMENTS

| | | |
|---|---|---|
| EP | 0731575 A2 | 2/1996 |
| EP | 0 893 759 A2 | 7/1998 |
| EP | 0 893 760 A2 | 7/1998 |
| EP | 0935182 A1 | 8/1999 |
| EP | 1120701 A1 | 8/2001 |
| EP | 1291786 A3 | 1/2005 |
| EP | 1291787 A3 | 3/2006 |
| GB | 2 342 195 A | 4/2000 |
| GB | 2 342 196 A | 4/2000 |
| GB | 2 342 197 A | 4/2000 |
| JP | 2001222387 A | 8/2001 |
| WO | 0067430 A1 | 11/2000 |
| WO | WO 02/061569 A2 | 8/2002 |
| WO | WO 03/009523 A2 | 1/2003 |

OTHER PUBLICATIONS

U.S. Appl. No. 09/340,749 (entitled "Standalone Device For Identifying Available Document Services In A Token Enabled Operating Environment").

Bluetooth Brochure. Printed Jun. 1, 2000.

Bluetooth Protocol Architecture, Version 1.0, Aug. 25, 1999.

Behind hp wireprint. Available on the Internet Aug. 2001 at: http://www.hpwire.com/hpwire/behind.asp.

Flynn et al., "The Satchel system architecture: mobile access to documents and services" Mobile Networks and Applications vol. 5, Issue 4, pp. 243-258, 2000.

Lamming et al., "Satchel: Providing Access to Any Document, Any time, Anywhere", ACM Transactions on Computer-Human Interaction vol. 7, Issue 3, pp. 322-352, 2000.

"PrintBoy Office Bundle", Cutting Edge Software, Inc., 1996-2001. Available on the Internet Aug. 2001 at http://www.cesinc.com/solutions/es_printboyoffice.html.

"HP Wire: Enabling E-printing Solutions for Enterprise". Available on the Internet Aug. 2001 at: http://www.hpwire.com/hpwire/media/whtpp.pdf.

"What is hp wire". Available on the Internet Aug. 2001 at: http://www.hpwire.com/hpwire/what_is.asp.

Liljeberg, M et al., "Mowgli WWW Software: Improved Usability of WWW in Mobile WAN Environments", Global Telecommunications Conference, New York, Nov. 1996, pp. 33-37, ISBN 07080333365.

* cited by examiner

METHOD AND APPARATUS FOR CONTROLLING DOCUMENT SERVICE REQUESTS USING A MOBILE COMPUTING DEVICE

CROSS REFERENCE TO RELATED APPLICATIONS

Cross-reference is made to U.S. Pat. No. 6,922,725 entitled "Method And Apparatus For Processing Document Service Requests Originating From A Mobile Computing Device", which is assigned to the same assignee as the present invention.

BACKGROUND OF INVENTION

The present invention relates generally to a method and apparatus for controlling the routing of documents from document servers to output devices via a mobile computing device, and more specifically, to a mobile computing device for bridging communications between a document server and an output device that operate on separate networks with no adequate preexisting connectivity.

Generally, while the use of mobile computing devices continues to increase, they continue to have limited storage capacities. Thus, although it may be possible to store documents on mobile devices, the size and number of documents stored on mobile computing devices is limited. In addition, since documents continue to increase in size because they include combinations of text, graphics, images, audio, and video, there exists a need for a capability to manage documents on mobile devices without requiring that they be physically present on the devices.

Besides the problem of limited storage on mobile computing devices, documents may need to be accessed in real time because they have been recently created or modified. That is, even if a document has been stored on a mobile computing device, a user may need to access the document from another location because recent updates are not incorporated in the document stored on the mobile computing device. Alternatively, real time access to documents may be desirable when unexpected access to a document that was not previously planned for is required and that document is not stored on the mobile computing device.

Token-enabled mobile computing devices provide one solution to these problems (hereinafter referred to as "the original token-based environment"). The original token-based environment is described in the following patent and patent applications, which are hereby incorporated herein by reference: U.S. Pat. Nos. 5,862,321 and 6,144,997 (entitled: "System and Method for Accessing and Distributing Electronic Documents"); U.S. Pat. No. 6,515,988 (entitled: "Token-Based Document Transactions"); U.S. Pat. No. 6,421,716 (entitled "System For Generating Context-Sensitive Hierarchically Ordered Document Service Menus"); U.S. Pat. No. 6,397,261 (entitled "Secure Token-Based Document Server"); U.S. Pat. No. 6,487,189 (entitled "Mobile Email Document Transaction Service"); U.S. Pat. No. 6,430,601 (entitled "Mobile Document Paging Service"); and U.S. Pat. No. 6,493,760 (entitled "Standalone Device For Identifying Available Document Services In A Token Enabled Operating Environment").

The original token-based environment distributes references to documents between mobile computing devices by transmission of the document references, rather than the documents themselves. More specifically, a mobile computing device described in the original token-based environment is adapted to store a collection of document identifiers (e.g., a URL "Uniform Resource Locator"). Each document identifier in the collection identifies a particular document, or service. Each mobile computing device thus holds document references, rather than the documents themselves, thereby eliminating the concern of storage capacity of the mobile computing device. Large documents containing any form of data can therefore apparently be carried using a mobile device and used to construct a print transaction request that can itself be submitted to a remote service such as a print service.

Mobile computing devices operating in the original token-based environment are thus programmed to receive, transmit, and store document identifiers. Each document identifier stored on a mobile computing device is associated with an electronic document stored in an electronic repository. In the original token-based environment, a document can be sent to a token-enabled (e.g., an IR transceiver equipped) network printer by "beaming" a document token, which references the document, from a mobile computing device to the network printer. The token-enabled network printer retrieves the complete document referenced by the document token, and immediately prints a copy of the document. So, to a user of the mobile computing device, documents are apparently passed between users, and output from, or input to token-enabled devices coupled to networks as expansive as the Internet.

In general, the original token-based environment provides that only a small amount of document data (e.g., document name and location) relating to a document is actually stored on the mobile computing device. Typically this is not a disadvantage since most mobile computing devices have a small display (or user interface) that limits the extent to which documents may be viewed. More importantly, this is not a disadvantage because mobile computing devices generally do not have application specific software installed which would impose additional storage and processing requirements for enabling the viewing and/or editing of documents stored in a particular application dependent format. For example, a document stored in the Microsoft® Word format cannot be displayed without software adapted to interpret that specific format. Thus, more generally it is not helpful to store documents on mobile computing devices because there tends to be inadequate storage and/or processing capacity for application software and data.

Presently, "non-token enabled" mobile computing devices operate using application specific and device specific programs that enable printing from a PDA (Personal Digital Assistant) to a standalone infrared (IR) enabled printer. For example, application specific programs that operate on a PDA such as Quickoffice™ sold by Cutting Edge Software, Inc. allow a user to create, edit, and view documents in the Microsoft® Word format. In addition, printer (more generally device) specific programs operate with the application specific software such as PrintBoy™ sold by Cutting Edge Software, Inc. to enable beaming from a PDA to a standalone IR enabled printer through the printer's IR port.

In addition to requiring application specific and device specific programs, such non-token enabled mobile computing devices must be pre-configured with print drivers to render documents in particular printer dependent formats (e.g., postscript, PCL). In particular, less expensive printers tend to require more specific print drivers (i.e., more printer dependent) than more expensive printers. Absent specific printer dependent drivers, documents stored directly on such non-token enabled mobile devices cannot be readily rendered to a format that will insure the most accurate reproduction of a document when beamed to the standalone IR enabled printer.

A disadvantage of such non-token enabled mobile computing devices over token-enabled mobile computing devices is that they only allow printing of documents stored directly on the PDA. An additional disadvantage of such non-token enabled mobile computing devices with application specific software loaded thereon is that the application specific software may not be exactly compatible with the original software that created a document. This incompatibility in software may cause the document to be rendered (i.e., print, view, etc.) at the mobile computing device different from the document creation software.

Unlike non-token enabled mobile computing devices, the mobile computing devices that are token-enabled with the original token-based environment (i.e., token-enabled mobile computing devices) do not require that application specific programs or print drivers be loaded directly onto the mobile computing device. Instead, a device such as a printer is token-enabled when it is has access to hardware and device specific software that enables it to receive both a document service request (over a wireless network), and the document to which the document service request references (over a wired network from a remote server coupled thereto). Token-enabling devices thus advantageously permits documents stored at locations other than directly on the mobile computing device to be output to devices such as printers.

However, because many output devices are not token-enabled, their services (e.g., printing, faxing, displaying, playing, etc.) are not immediately available to mobile computing devices that are token-enabled (i.e., loaded with a token-enabling device specific software). Devices not equipped to transmit, receive, and manage document tokens (i.e., non token-enabled devices), however, can be made token-enabled with the addition of a token-enabler unit (e.g., an infra-red transceiver, and associated computer and software). In this configuration, the non-token enabled device mounted with a token-enabler unit is made token-enabled as long as it has an existing network connection with a token-enabled server, as described in U.S. Pat. No. 6,493,760.

However even with the token-enabler unit, some token-enabled mobile computing devices may continue to have no connectivity with output devices that remain non token-enabled because there is no existing network connection between a token-enabled server and the output device. In addition, some token-enabled mobile computing devices may suffer from inadequate preexisting connectivity with token-enabled output devices. Inadequate preexisting connectivity (i.e., can't adequately get from a source to a destination) may exist when circumstances make it more advantageous to communicate with a token-enabled device over one communications channel instead of another. For example, printing in an existing token-based network may require that the content of the document be transmitted from a token-enabled server over an insecure and/or unreliable network such as the Internet to a printer.

There exists therefore a desire to provide an improved path for routing document service request originating at a mobile computing device and taking place between a token-based server and an output device that has either no existing network connectivity or inadequate network connectivity with the token-based server. It would be further desirable if such an improved path for routing documents would provide increased security (e.g., a secure channel) and/or reliability (e.g., guaranteed bandwidth) in the event there is an existing but inadequate connection between the token-based server and the output device.

SUMMARY OF INVENTION

In accordance with the invention there is provided a method, and apparatus and article of manufacture therefor, for controlling a document service request originating at a mobile computing device that has at least two communications channels. The two communications channels are used to form a path between a document server and an output device via the mobile computing device for carrying out the document request when there is no adequate preexisting network connectivity between the document server and the output device.

In accordance with one aspect of the invention, the document service request, which includes a first parameter identifying a document accessible to a document server, is initiated at the mobile computing device. Device information is obtained at the mobile computing device that identifies a type of output device available over one of the two communications channels. The identified device information is added, at the mobile computing device, as a second parameter to the document service request. From the mobile computing device, the parameters of the document service request are transmitted to the document server over one of the two communications channels. At the mobile computing device, a connection is controlled between the document server and the output device to transmit there between the document in a format suitable for the output device. The mobile computing device establishes the connection with the document server over a first of the two communications channels and with the output device over a second of the two communications channels.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

A. General Operating Environment

Figure 1:
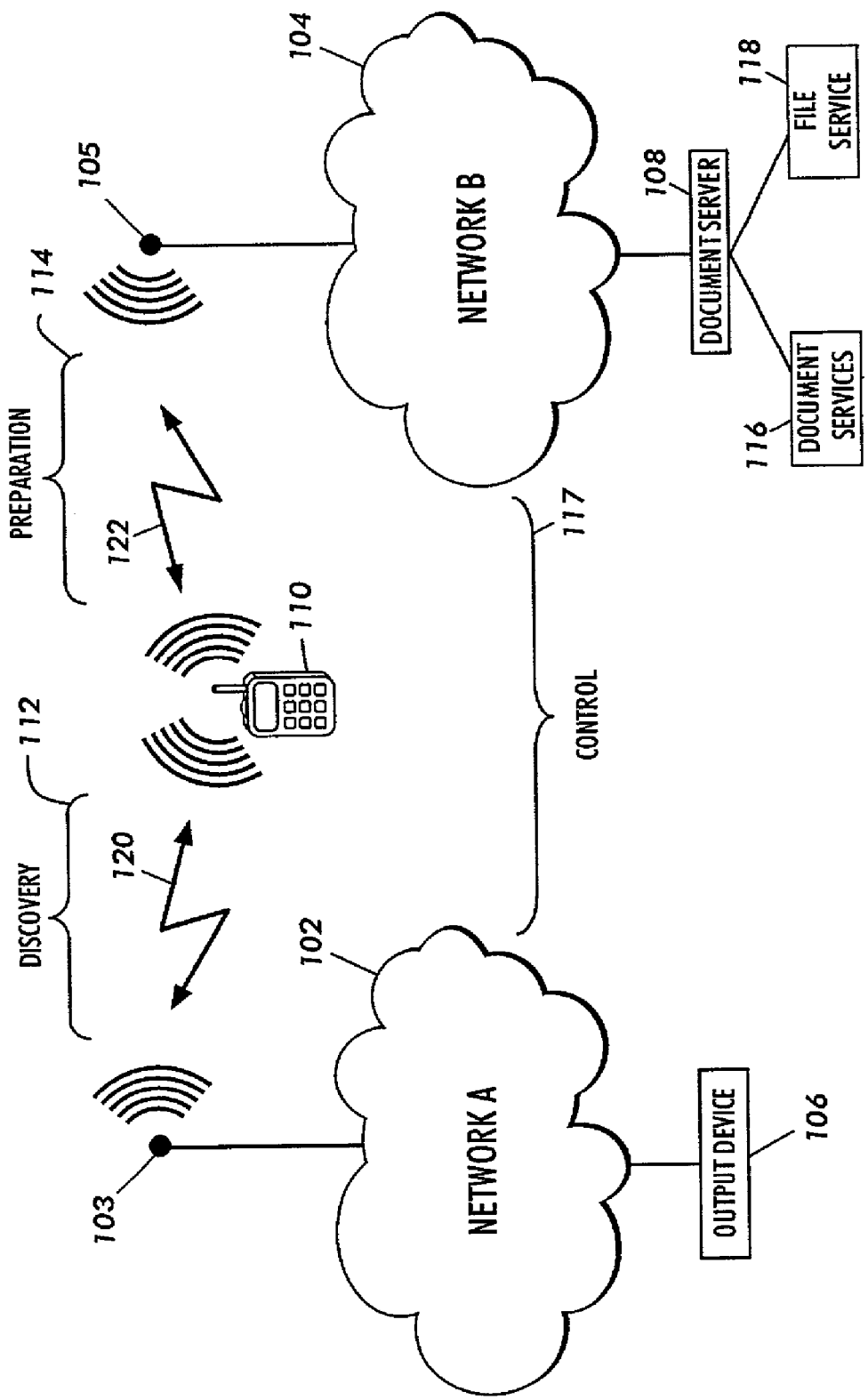
FIG. 1 illustrates the general operating environment of the invention in which a first network ("Network A") has no adequate preexisting connectivity to a second network ("Network B")

FIG. 1 illustrates the general operating environment of the invention in which a first network 102 ("Network A") has no adequate preexisting connectivity to a second network 104 ("Network B"). A network is defined herein as a collection of one or more computational devices that is adapted to communicate with each other. The network may be wired or wireless, wide (WAN) or local (LAN). Wired and wireless networks can for example communicate using protocols such as Ethernet and ATM (Asynchronous Transfer Mode). A wireless network can for example operate in a wireless field using the IEEE 802.11 standard. In addition, a network can be an ad-hoc network that can be formed by stand-alone devices coupled to wireless transceivers.

Wireless ad-hoc networks generally have no centralized control that requires devices to be pre-registered thereto so that they may operate thereon. Instead, wireless ad-hoc networks are formed on demand by the devices themselves, for example when appropriately enabled devices are in a predefined range and/or line of sight. A wireless ad-hoc network may be enabled on a device, such as a printer, using a temporary plug-in connection, such as a parallel port adapter that enables IR wireless communication. Some or all of the devices that form part of a wireless ad-hoc network create a communication session when they have temporary physical proximity to each other. For example, an ad-hoc network is formed when a PDA transmits a document for printing at an IR enabled printer.

In FIG. 1, the networks 102 and 104 are adapted to be interconnected using transceivers 103 and 105, respectively. The transceivers 103 and 105 may, for example, be IR (infra Red) or RF (Radio Frequency) transceivers or any other wireless mechanism. Each transceiver may include a transmitter, a receiver, a control module, communication functions, and an antenna. In addition, each transceiver may be a standalone device that is coupled to a computational device or integrated therein.

IR communication standards include standards set by the Infrared Data Association (IrDA) for establishing limited communications channels (also referred to herein as an "LLC"). RF communication standards include Global System for Mobile communications (GSM) for establishing unlimited communications channels (herein also referred to as a "UCC") and Bluetooth™ standards for establishing limited communications channels (LCC).

An unlimited communications channel (UCC), unlike a limited or short-range communications channel (LCC) which is designed to specifically operate over a short-range (i.e., on the order of meters), is a communications channel that is adapted for long-range communications (i.e., on the order of kilometers) that can be achieved for example using long range cordless phones, satellite phones, and mobile phones operating using for example a cellular and/or satellite networks.

A connection between the two networks 102 and 104 is inadequate when there is either: no connection between the two networks that exists; or the (existing) connection is insufficiently trusted, cost-effective, compatible, reliable, and/or fast. That is, a connection is inadequate when, for example, data cannot get from a source device (e.g., document server 108) to a destination device (e.g., output device 106) in a manner that is sufficiently trusted, cost-effective, compatible, reliable, and/or fast.

More specifically, a connection between two networks is generally not trusted if the connection provides an insufficient level of security for the particular data being transmitted. A connection between two networks is generally not compatible if the two networks communicate using different protocols. A connection is generally not reliable if it is unpredictable by, for example, intermittently failing or severely degrading. A connection is generally not sufficiently fast when a minimum data rate is required and cannot be guaranteed or sustained to process a transaction within a reasonable or desired time period.

Forming part of the first network 102 is an output device 106. The output device 106 can be any output device that can be coupled in some form to the first network 102. Examples of the output device 106 includes rendering devices such as printers and facsimiles, display devices such as CRTs or flat panel displays, and file storage devices such as file servers.

Forming part of the second network 104 is a document server 108. The document server 108 may have integrated therein or communicatively coupled thereto on one or more devices, document services 116 and a file service 118. In one embodiment, the document services consists of a conversion service that is adapted to convert a document in a first format to a second format. The first format may for example be in a device or application independent format and the second format in a device or application dependent format. The file service 118 is adapted to return a document given a document reference such as a URL (Universal Resource Locator).

In an alternate embodiment, the document services 116 include a number of services that are not device specific such as a translation service, a summarization service, a recommender service, and an enrichment service that can be applied on their own or in addition to applying a device specific service (e.g., printing). In one embodiment, these none device specific services are identified by an additional parameter in the document service request when they are applied in addition to a device specific service. The translation service translates a document from one language to another using well known translation systems. The summarization service summarizes document content in one of a plurality of well-known methods. The recommender service may provide recommendations using a recommender system such as Knowledge Pump developed by Xerox Corporation. The enrichment service may be provided by a meta-document management system as described in U.S. patent application Ser. No. 09/543,962.

Bridging the two networks 102 and 104 to form a path of connectivity between the output device 106 and the document server 108 is a mobile computing device 110. The mobile computing device 110 is adapted to store thereon one or more document references. The one or more document references stored on the mobile computing device may for example either be retrieved from a server or another mobile computing device or created directly thereon. The contents of document references stored on the mobile computing device 110 can be located and retrieved by the document server 108. Examples of mobile computing devices include, mobile phones, PDAs (Personal Digital Assistants), portable computers, communicators, etc.

In addition, the mobile computing device has embedded therein one or more transceivers for establishing a first wireless communications channel 120 with the output device 106 and a second wireless communications channel 122 with the document server 108. Each of the wireless communications channels of the mobile computing device may be either entirely or partially used to complete a communication link with the output device and the document server.

In bridging the two networks 102 and 104, the mobile computing device 110 performs discovery functions 112, preparation functions 114, and control functions 117. In performing the functions 110, 112, and 114, the mobile computing device 110: (a) initiates a document service request, (b) discovers the output device 106, (c) communicates with the document server 108, and (d) controls communication between the output device 106 and the document server 108. These and other functions are described in more detail below while referring to specific embodiments of the invention.

B. Mobile Computing Device Functions

Figure 2:
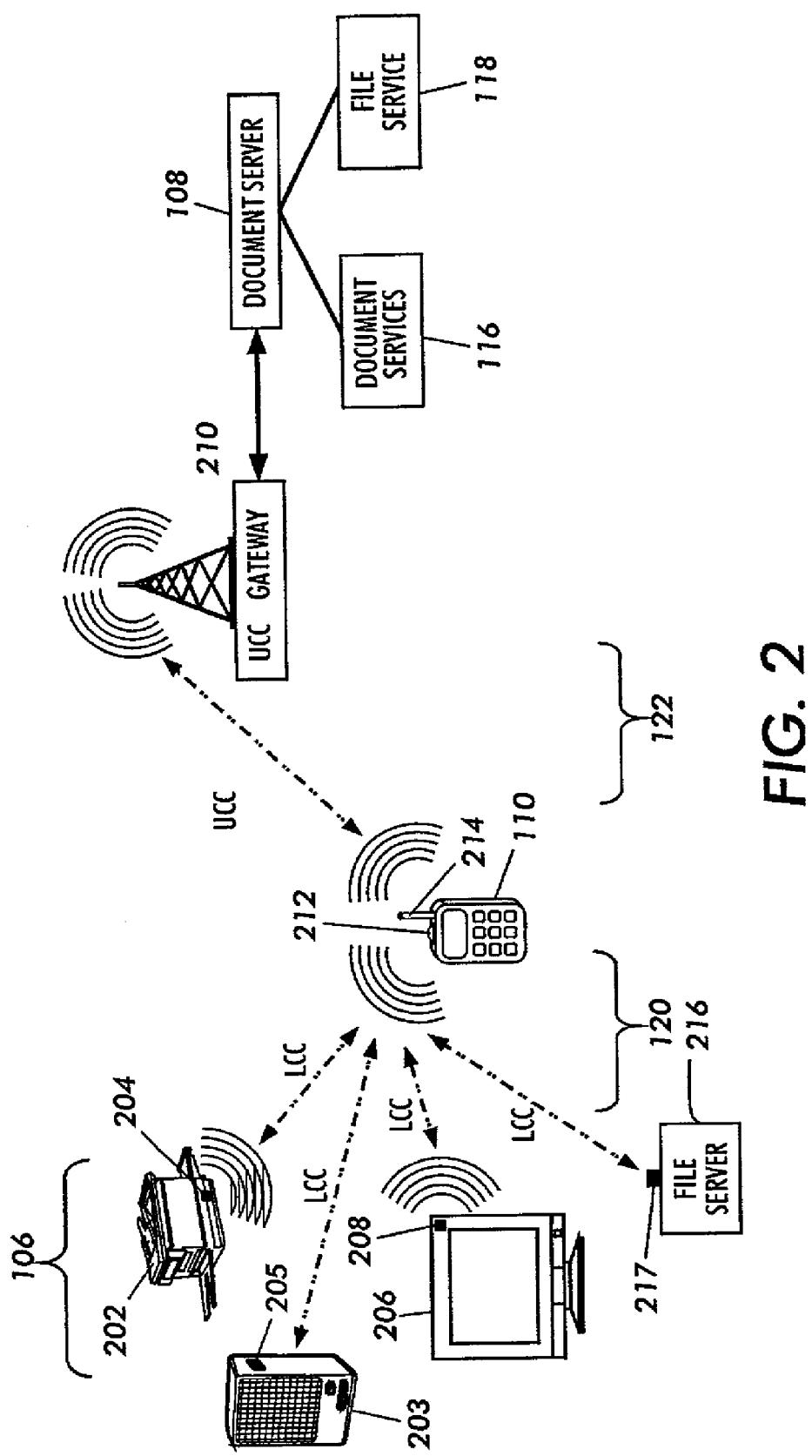
FIG. 2 illustrates one embodiment of the general operating environment illustrated in FIG. 1 in which the mobile computing device communicates with an output device over a first communications channel and with a document server over a second communications channel.

FIG. 2 illustrates one embodiment of the general operating environment illustrated in FIG. 1. In the embodiment shown in FIG. 2, the mobile computing device 110 communicates using an LCC transceiver 212 (e.g., an IR transceiver) over the first communications channel 120 with the output devices 106. The output device 106 could be one or a combination of a printer 202 having an LCC transceiver 204, a speaker 203 having an LCC transceiver 205, a display 206 having an LCC transceiver 208, and a file server 216 having an LCC transceiver 217. In addition, the mobile computing device 110 communicates using UCC transceiver 214 (e.g., an RF transceiver) over the second wireless communications channel 122 through UCC gateway 210 with the document server 108.

The printer 202, display 206, speaker 203, or file server 216 may be either directly or indirectly coupled to LCC transceivers 204, 205, 208, and 217, respectively. For example, the input devices 106 may have the LCC transceiver 204 embedded in the device or coupled to their parallel port (e.g., a printer parallel port) using, for example, a parallel port IR wireless adapter. Alternatively, the output devices 106 may be coupled indirectly through an IR enabled laptop computer.

Figure 3:
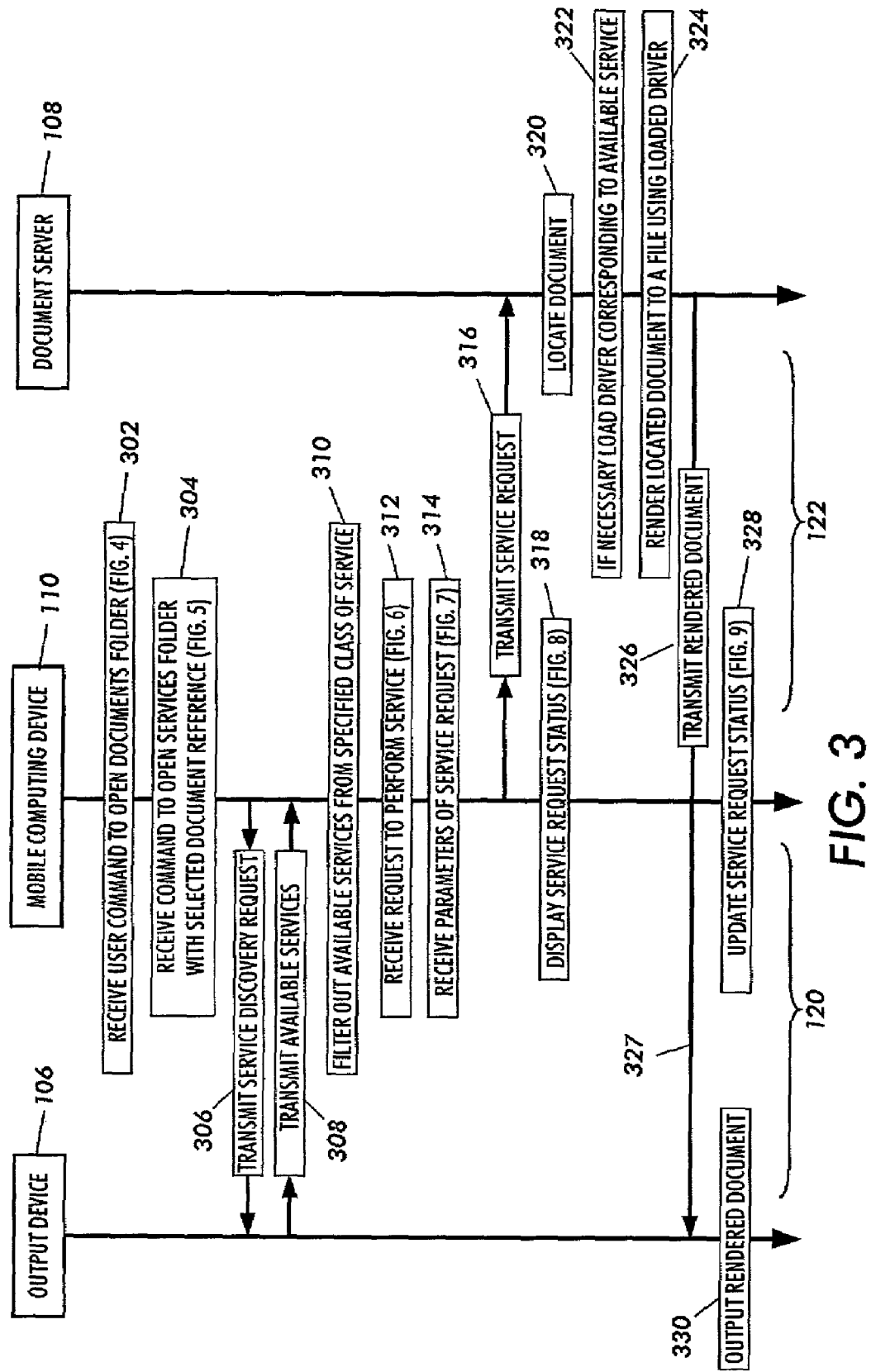
FIG. 3 depicts actions performed by the output device, the mobile computing device, and document server to perform a document service request.

FIG. 3 depicts actions performed by the output device 106, the mobile computing device 110, and document server 108 to perform a document service request. The order of each operation is performed from top to bottom although it will be appreciated by those skilled in the art that the operations performed in FIG. 3 may be reordered to provide the identical or similar function.

In addition, it will be appreciated that operations performed on the document server 108 need not be performed on that device but instead on any one of a number of devices coupled thereto. Furthermore, it will be appreciated that although the embodiment described herein refers to printing as an example document service request, many alternate document service requests can be provided using similar operations such as viewing, filing, emailing, and faxing.

Figure 4:
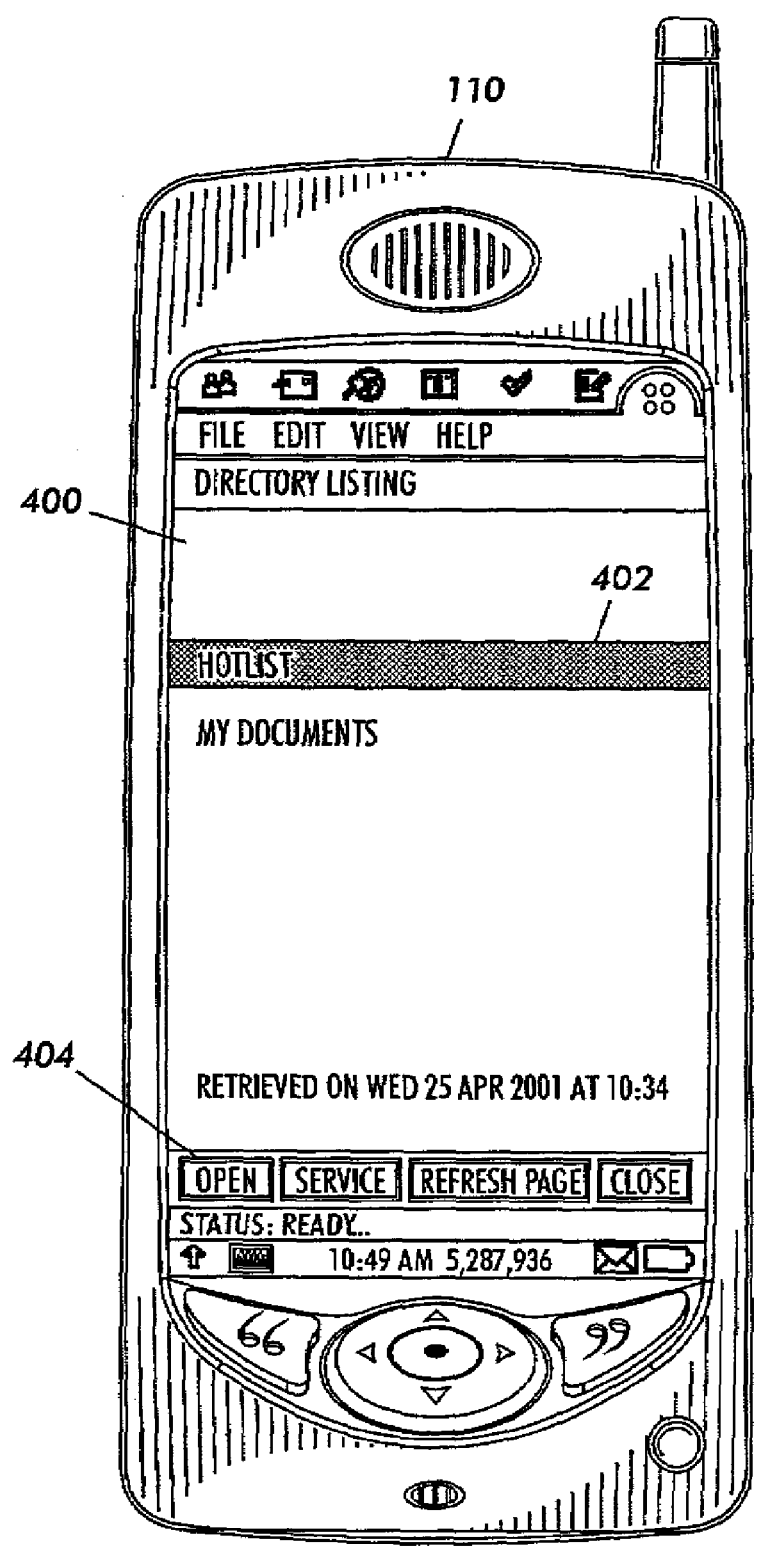
FIG. 4 illustrates an example display on the mobile computing device on which a user has requested a directory listing.

Initially at 302, the mobile computing device 110 receives a command from a user of the device to open a documents folder. FIG. 4 illustrates an example display on the mobile computing device 110 on which a user has requested a directory listing 400. In this particular example, the user selects a document folder 402 entitled "hotlist" from the directory listing 400 and invokes the open button 404. In alternate embodiments, the user may browse document folders on servers referenced for example by a document token.

Figure 5:
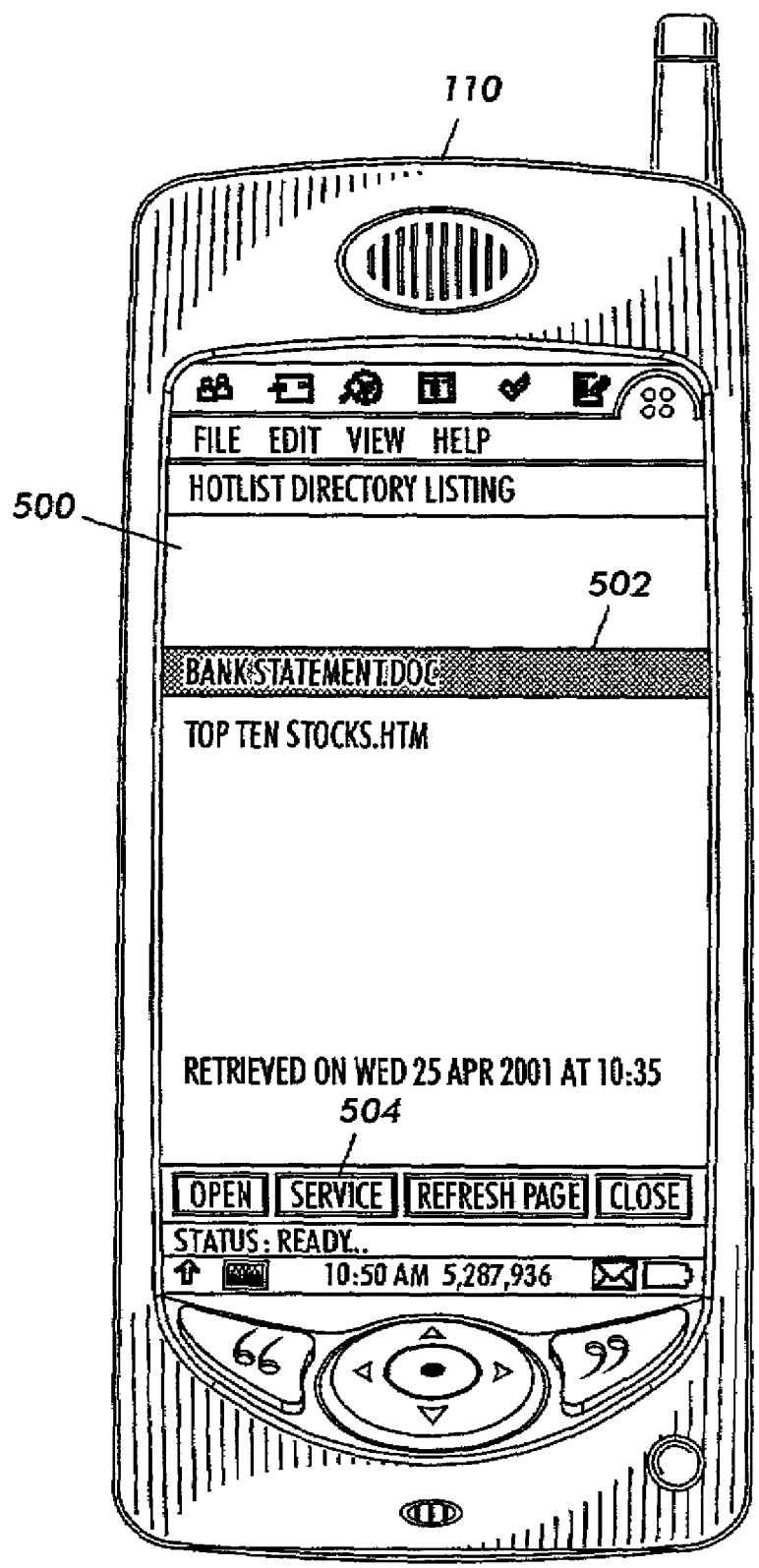
FIG. 5 illustrates an example display on the mobile computing device after a user has requested a documents folder listing.

At 304, the mobile computing device 110 receives a command from the user to open a services folder with a selected document reference. FIG. 5 illustrates an example display on the mobile computing device 110 after a user has requested a documents folder listing 500 for the "hotlist" directory listing. From the document folder listing 500, the user selects a document reference 502 entitled "bank statement.doc" and invokes the service button 504.

At 306 in response to the user request to display services appropriate to the selected document reference, the mobile computing device 110 transmits a service discovery request over the first wireless communications channel 120. At 308 in response to the discovery request, the output device 106 transmits device information from which the nature of the particular services available may be deduced, derived or extracted. The device information may consist of simply the name of a particular output device (e.g., BJC-50). In addition, the device information may include a list of available services at the output device. Alternatively, the list of available services may be implied by the device information and identified using a device type (e.g., name, class, make, format, etc.) to available service lookup table stored at the mobile computing device or accessible to the document server.

Because more than one output device may be in range when the service discovery request is transmitted at 306, multiple output devices may respond to the service discovery request by transmitting a list of available services. Thus, at 308 multiple lists of available services may be received depending on the number of output devices in range of the mobile computing device at the time the service discovery request is performed.

It will be appreciated by those skilled in the art that discovery requests can take on a multitude of forms. For example in one embodiment transmitting a discovery request might be unnecessary and could be performed by simply listening for broadcasts of available services from the output devices 106 to identify at least one output device. In another embodiment discovery requests could be performed in two wireless exchanges: first identifying output devices; and second identifying services a particular device can perform. In yet another embodiment, output devices can be preselected by the user on the mobile computing device and their presences confirmed by a discovery request.

Depending on the type of limited communications channel (LLC) employed (e.g., RF or IR) different constraints may limit the field that communications may take place over the LLC. For example, communication a limited communications channel may be limited by distance and/or line of sight or any other criterion physical or computed (e.g., all Xerox color printers located in Europe). An IR transceiver is an example of a limited communications channel limited by distance and line of site. A low power RF transceiver in contrast is limited by distance (i.e., power) but not line of site. Such a low power RF transceiver could for example be enabled to meet Bluetooth™ specifications. IR transceivers and low power RF transceivers are two embodiments that enable a limited communications channel (LLC).

In another operating environment, the discovery request performed at 306 is made from a Bluetooth™ enabled mobile computing device to a Bluetooth™ enabled printer. A Bluetooth™ enabled devices is a device adapted to communicate using the Bluetooth™ wireless standard. In this operating environment, the mobile computing device is physically located a limited distance from the printer (e.g., preferably less than ten meters), while at the same time being physically located an unlimited distance from (i.e., a distance that is limited only by the mobile computing devices ability to transmit the distance to) the document server. In one embodiment, the mobile computing device is adapted to communicate with the document server through a gateway to a network on which the document server is located.

At 308, the output device 106 transmits over the first wireless communications channel 120 a list of available services as part of discovery communications with the mobile computing device 110. The list of available services may impliedly or explicitly specify a desired or preferred format in which to receive input and whether the device is ready to receive input (i.e., device status).

At 310, from a pre-defined list of required services known a priori to the mobile computing device, a user-definable filter is applied to those services known a priori and the services identified through the discovery request. The user-definable filter can either remove services that are not desired by the user or sort the services that are displayed to the user. For example, the filter could sort and select those services that are identified to be most proximate to the mobile computing device to be listed first on a display.

Figure 6:
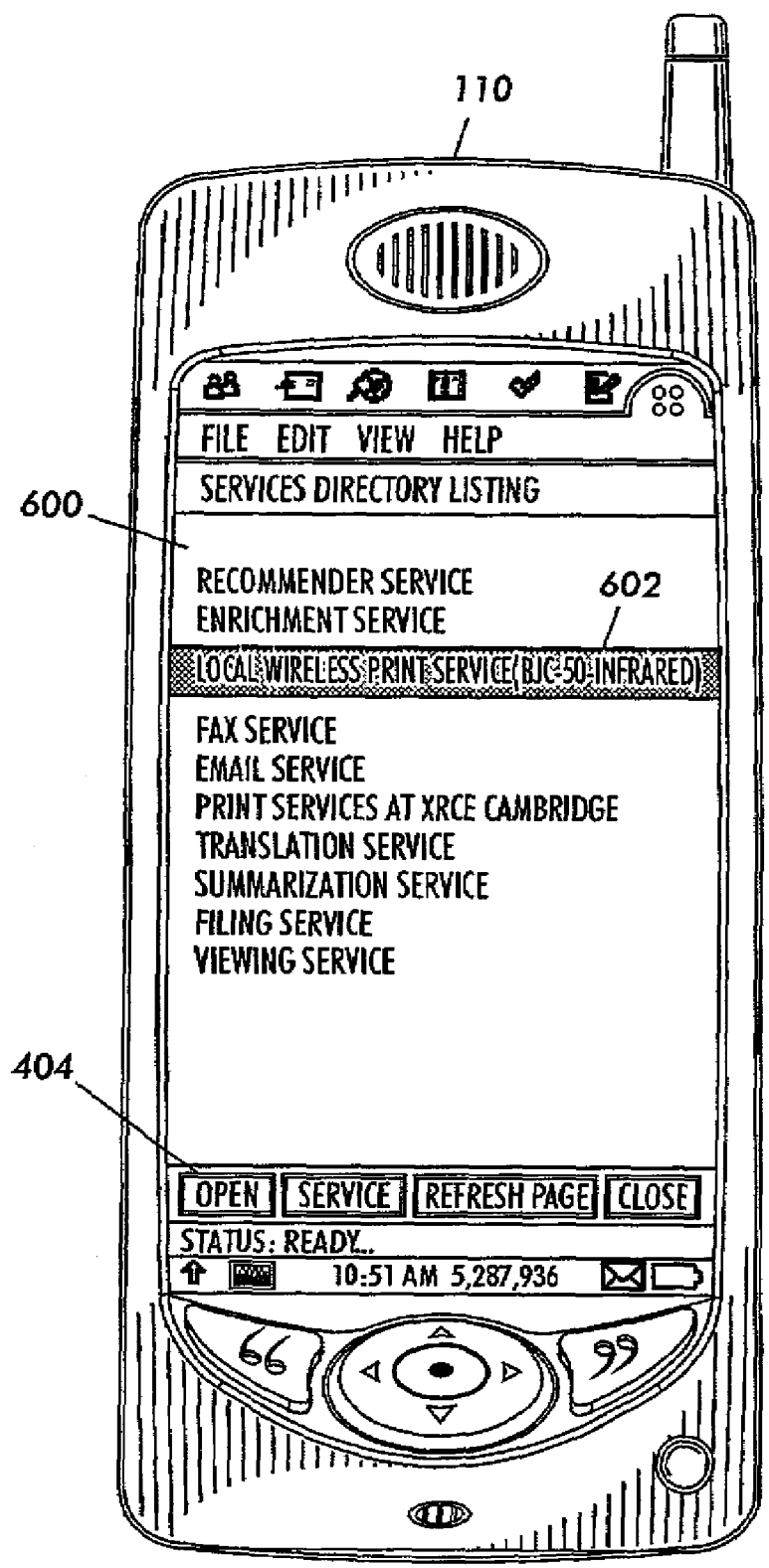
FIG. 6 illustrates an example display on the mobile computing device after a user has requested a services directory listing for a selected document reference.

At 312, the mobile computing device 110 receives a request originating from a user to perform a selected service to the earlier specified document reference. The request originating from the user identifies a type (e.g., name, class, make, format, etc.) of output device for performing the selected service. FIG. 6 illustrates an example display on the mobile computing device 110 after a user has requested a services directory listing 600 for the earlier selected document reference entitled "bank statement.doc". From the services directory listing 600, the user selects a service 602 entitled "Local Wireless Print Service (BJC-50 infrared)" and invokes the open button 404.

Alternatively, the user could have selected one more of the other document services listed in the directory listing 600 (e.g., format conversion, translating, recommending, summarizing, enriching, etc.) in addition to an output destination (e.g., printing, viewing, email, etc.). These other document services could have been applied (in succession and possibly in a predetermined order) before output to the selected output destination. Thus for example, assuming the user selects the summarization service and the local wireless print service 602 to be applied to the selected document reference 502. In this specific example, the document server 108 could apply the summarization service to the document content identified by the selected document reference before preparing the resulting summary for printing.

At 314, the parameters of the document service request are defined. These parameters include the document service selected at 312 (e.g., Local Wireless Print Service (BJC-50 infrared)) and the document reference selected at 304. In addition, other parameters may be specified depending on the service to be performed and the services available at the particular output device selected.

Figure 7:
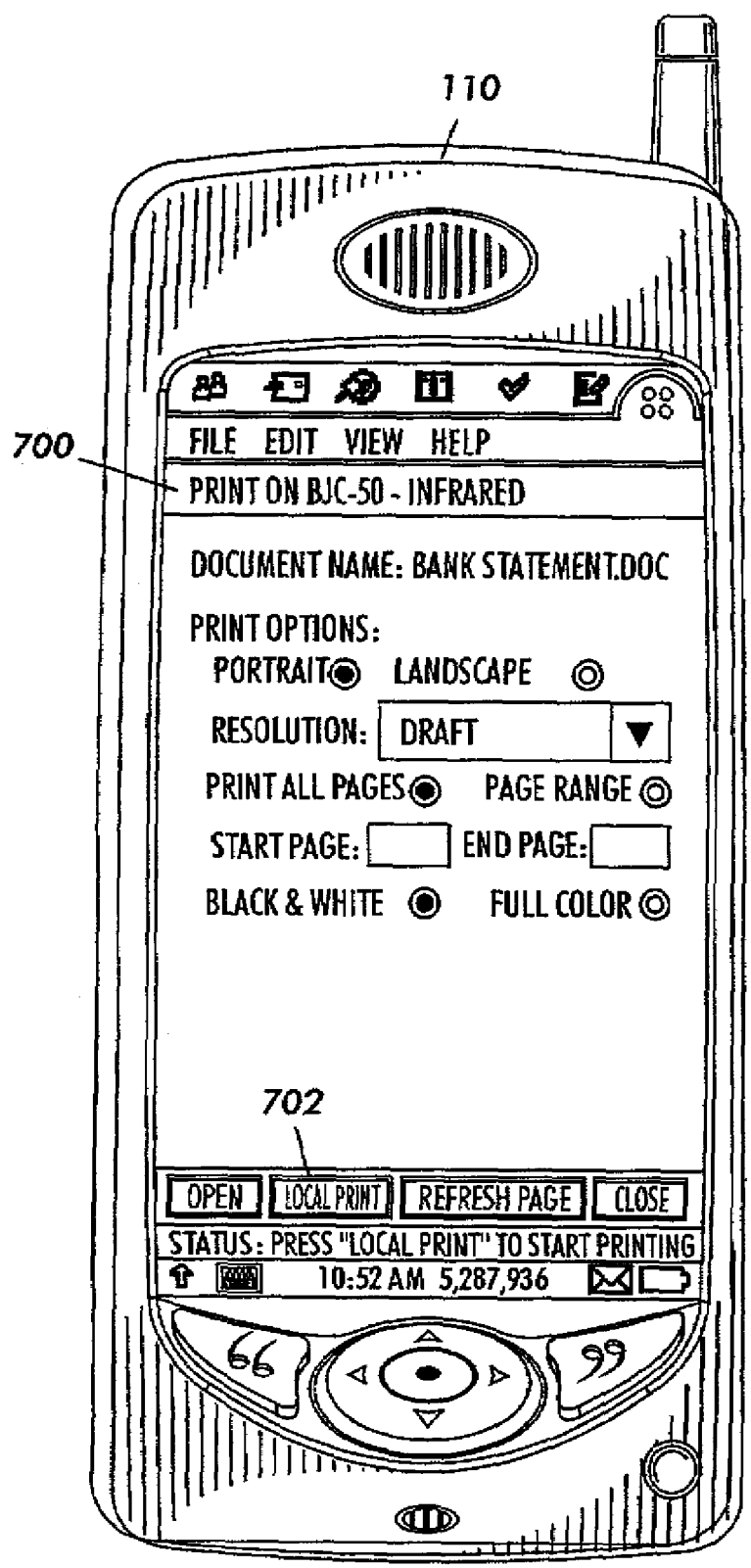
FIG. 7 illustrates an example display of a service request for a selected document service.

For example, FIG. 7 illustrates an example display on the mobile computing device 110 of a service request 700 for the earlier selected document reference service "Local Wireless Print Service (BJC-50 infrared)". From the service request 700, the user selects additional parameters available at the selected print service "Local Wireless Print Service (BJC-50 infrared)", which include number of copies and range of pages to be printed, and "presses" the print button 702.

Figure 8:
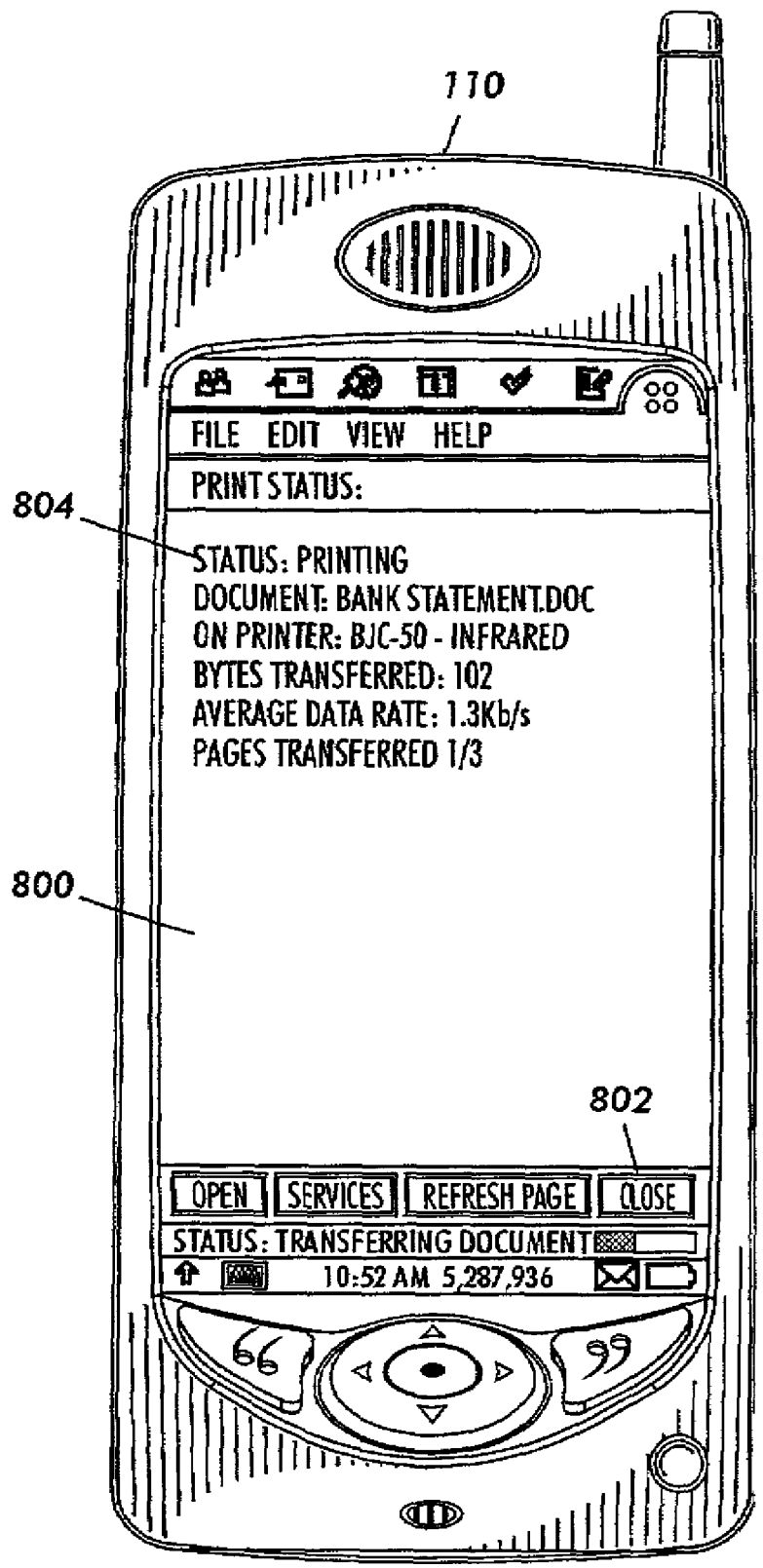
FIG. 8 illustrates a status window that specifies the status of the document service request initiated in FIG. 7.

At 316, the parameters of the document service request defined at 314 are packaged and transmitted over the second wireless communications channel 122 to the document server 108. Subsequent, before, or concurrent therewith, feedback of the document service request is displayed to the user at 318. For example, FIG. 8 illustrates a status window 800 that specifies the status of the document service request initiated in FIG. 7. Specifically, the status window 800 specifies that the document identified by selected document reference "bank statement.doc" is being printed on the printer "BJC-50" using an infrared communications channel.

At 320, responsive to receiving the document service request from the mobile computing device 110, the document server 108 locates the document identified by the document reference specified as a parameter in the document service request. Locating the document reference by the document identifier may consist of retrieving the document from a storage device local to the document server or remote from the document server. Storage devices such as file servers that are remote from the document server may be accessed over networks such as the Internet to which the document server is coupled.

At 322 after retrieving the document identified by the document reference, a driver is loaded if necessary (i.e., not already loaded) for the specified output device that is adapted to process the format in which the retrieved document exists. For example, receipt of the document service request for printing "bank statement.doc" on a BJC-50 printer causes the print driver for the BJC-50 printer to be loaded at the document server. In the event the driver is already loaded, no action needs to be taken at 322 by the document server.

At 324, an application program executes at or under the direction of the document server 108 to render the document located at 320. The application program for rendering the located document is adapted to read the document in its native format and render the document using the loaded driver to a format specified that is acceptable to the specified output device.

Generally, output devices can accept data in more than one format. However, there is typically one format that produces the highest quality output or yields the best device performance. For example, a printer may be capable of receiving and printing a document in ASCII format as well as another printer dependent format. However, in most instances printing documents in the ASCII format is insufficient to represent more complex documents that include images, video, audio, and/or graphics, although printing documents in the ASCII format may result in faster throughput if very limited bandwidth is available on either of the two communications channels.

Continuing with the example above in which the document service requested involves printing "bank statement.doc" on a BJC-50 printer. In one instance, the application program loaded at 324 to render "bank statement.doc" is Microsoft® Word because "bank statement.doc" is in the Microsoft® Word format. In addition in this example, the document server directs the application program Microsoft® Word to: load "bank statement.doc" and print "bank statement.doc" while specifying that the loaded document is to be rendered in a format suitable for a BJC-50 printer (i.e., with the appropriate print driver for a BJC-50 printer) and that the document is to be printed to a file (i.e., a print file).

When printing the loaded document "bank statement.doc" to a file, the application program Microsoft® Word saves a print file that records the loaded document in a printer language suitable for the selected BJC-50 printer. The print file saves the necessary information from the loaded document in the printer dependent language so that document formatting will be accurately reproduced on the selected printer. Consequently, the selected printer can communicate with and receive the print file independent of the document server operating the application program Microsoft® Word. It will be appreciated, that any printer using a similar printer language as the selected printer can render the print file and match the original document provided that similar fonts used in the document are available at each printer.

In some circumstances no suitable format may exist to convert the document from its native format to a preferred device dependent format. In this situation the conversion service that forms part of document services 116 is used to convert the document to an intermediate format before being rendered to a device dependent format. It will be appreciated that in some embodiments such conversion services may form part of application programs such as Microsoft® Word. That is, depending on the particular document being printed and the particular application program loaded, the conversion service that forms part of document services 116 may not be required since some conversions may be performed by the application program loaded by the document server.

For example, in printing a document in WordPerfect® format using the Microsoft® Word application program, the Microsoft® Word application program first translates the document from the WordPerfect® format to the Microsoft® Word format before rendering it with a print driver to a device dependent format. Alternatively, if the Microsoft® Word application program received a document format that it did not understand, then the conversion service is adapted to chain together one or more programs to convert from any document format via a plurality of formats, if need be, to arrive at a format that the Microsoft® Word application program understands.

In summary, preparing a document service request at 320, 322, and 324 involves: identifying and retrieving (if necessary) the document referenced by the document service request; identifying what properties, including acceptable or preferable device dependent formats, of the device the document is to be output to; selecting the most appropriate device dependent format to render the document from its original format; if no suitable format exists, identifying a format to convert the document from its original format into another acceptable format before rendering the document to the most appropriate device dependent format.

In an alternate embodiment, a document service request is anticipated and prepared in advance at the document server. In this alternate embodiment, preparing a document service request consists of identifying the format of the document that was prepared in advance. The format can be specified using either a default value or one of a predefined set of values. In the event a format is desired which has not been created in advance, the document can then be rendered on the fly in the desired format. Thus, in some instances requesting a document by name (e.g., "bank statement.ps") may be sufficient to satisfy both the document name as well as the desired format (e.g., postscript) in which the document is to be rendered.

At 326, the document at 324 now in output format is transmitted to the mobile computing device over the second wireless communications channel 122 under the direction of the document server 108. Upon receipt of the rendered document from the document server, the mobile computing device relays the rendered document over the first wireless communications channel 120 to the output device 106 at 327. Depending on the particular mobile computing device, data representing a portion of the rendered document is transmitted to the output device by the mobile computing device 110 sequentially and/or simultaneously as it is received from the document server.

Those skilled in the art will appreciate that although the document server prepares an identified document in a format suitable for a specified output device, and that this preparation may include conversion using document format converts and/or rendering using device specific drivers, certain transformations of the document may take place at the mobile computing device and/or at the output device. Such transformations may be, for example, performed for the purpose of compression, security, and/or efficiency, thereby making better use of the communications channel.

Figure 9:
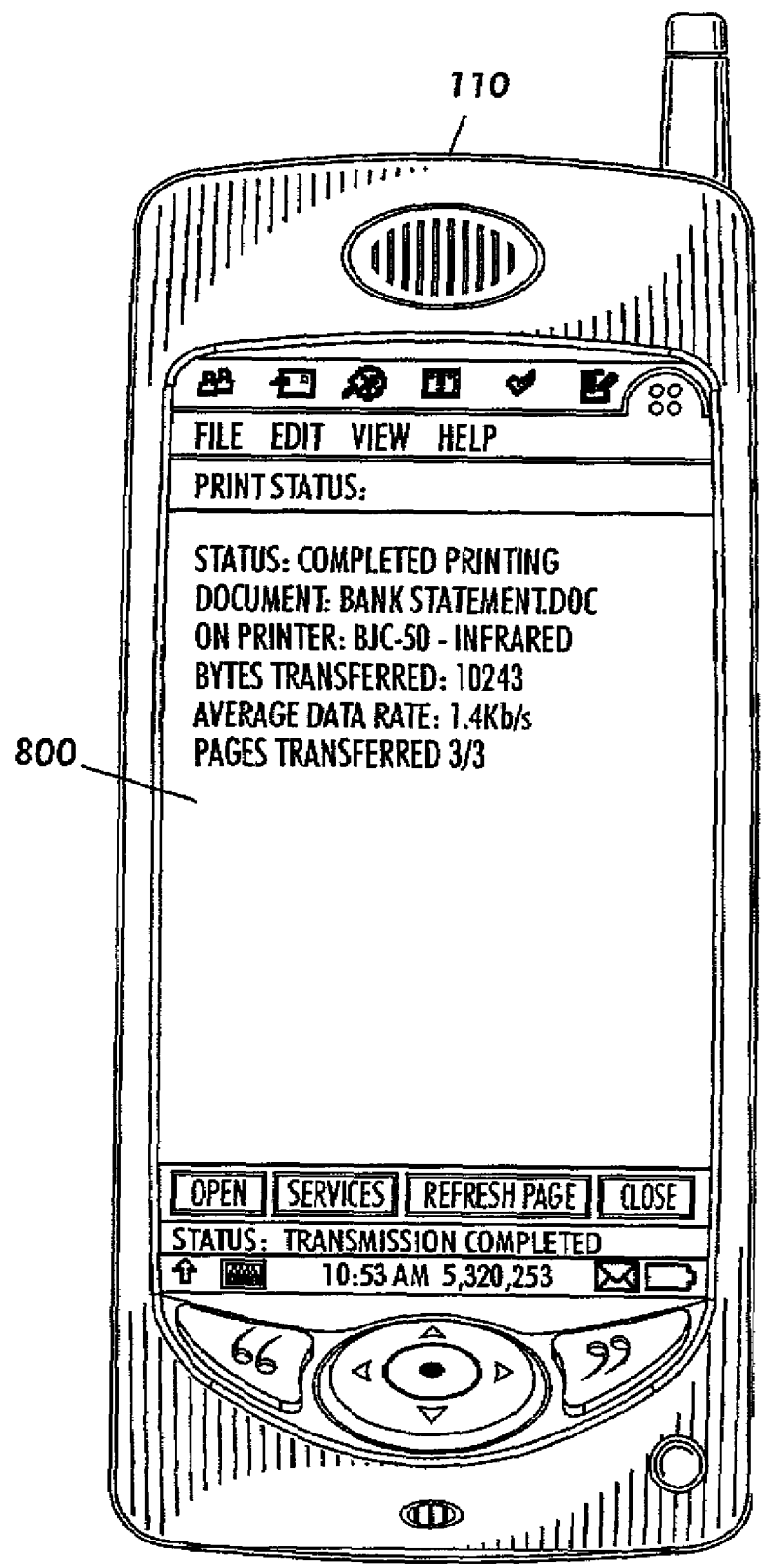
FIG. 9 illustrates the status window shown in FIG. 8 updated to indicate the document service request has completed successfully.

Once the transmission of the rendered document is completed at 326 and 327, the mobile computing device updates the status of the document service request at 328 and the output device outputs the rendered document at 330. The output device may output the rendered document at 330 either once the rendered document is completely received from the mobile computing device or as it is received (i.e., on the fly) from the mobile computing device. FIG. 9 illustrates the status window 800 shown in FIG. 8 updated to indicate the document service request has completed successfully.

C. Alternate Communication Embodiments

Figure 10:
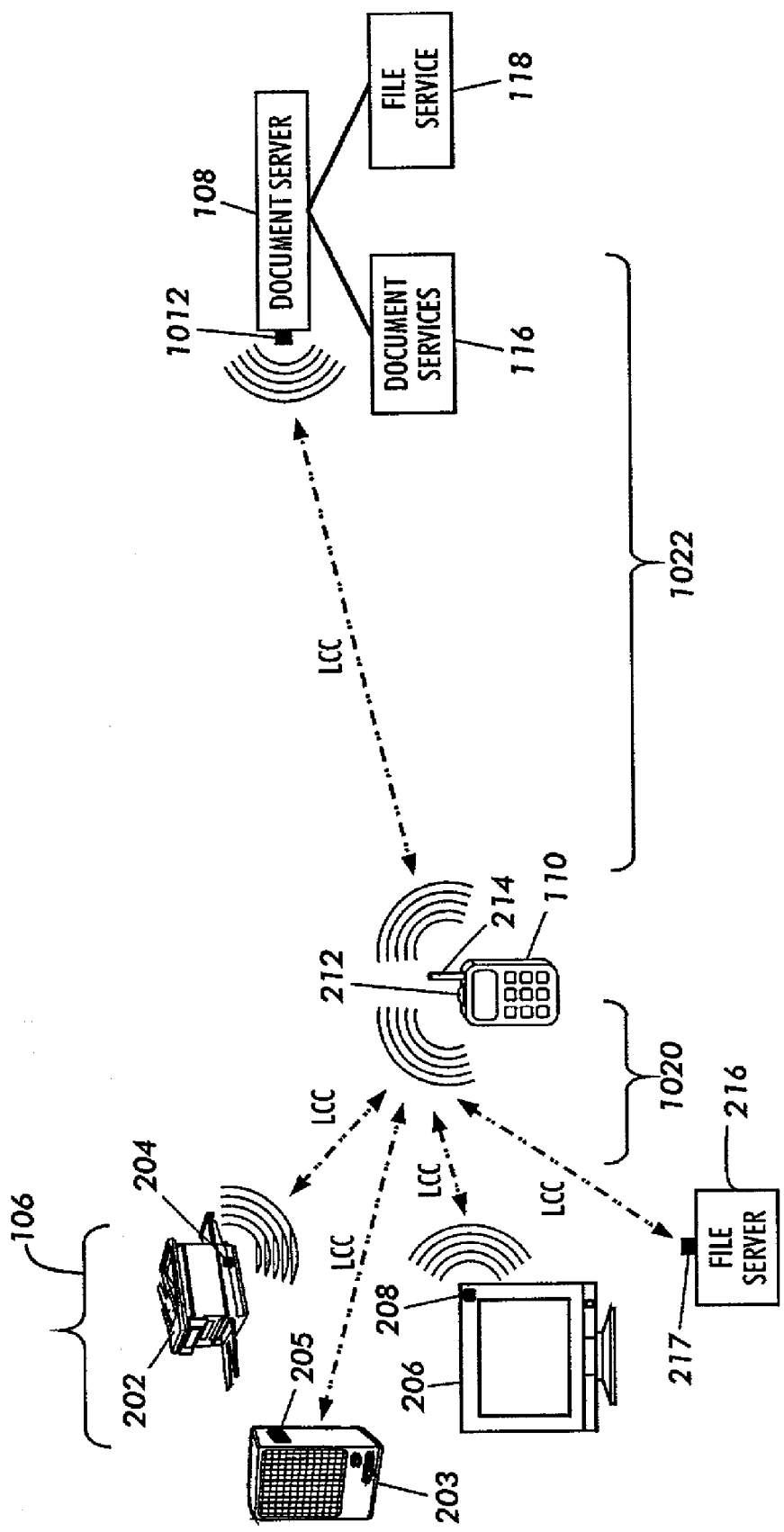
FIG. 10 illustrates an alternate embodiment in which a mobile computing device, document server, and output device communicate over limited communications channel(s)

FIG. 10 illustrates an alternate embodiment in which the first communications channel 1020 and the second communications channel 1022 are limited communications channels. In operation, both the output devices 106 and the document server 108, which is coupled to an LCC transceiver 1012, respond to a discovery request by the mobile computing device 110 (e.g., act 306 in FIG. 3). However, the remaining actions taken by the mobile computing device, the document server, and the output device are similar to those set forth in section B above. This embodiment is intended to exist in an operating environment in which the output device, the mobile computing device, and the document server (or input device) are all proximately located to each other.

Figure 11:
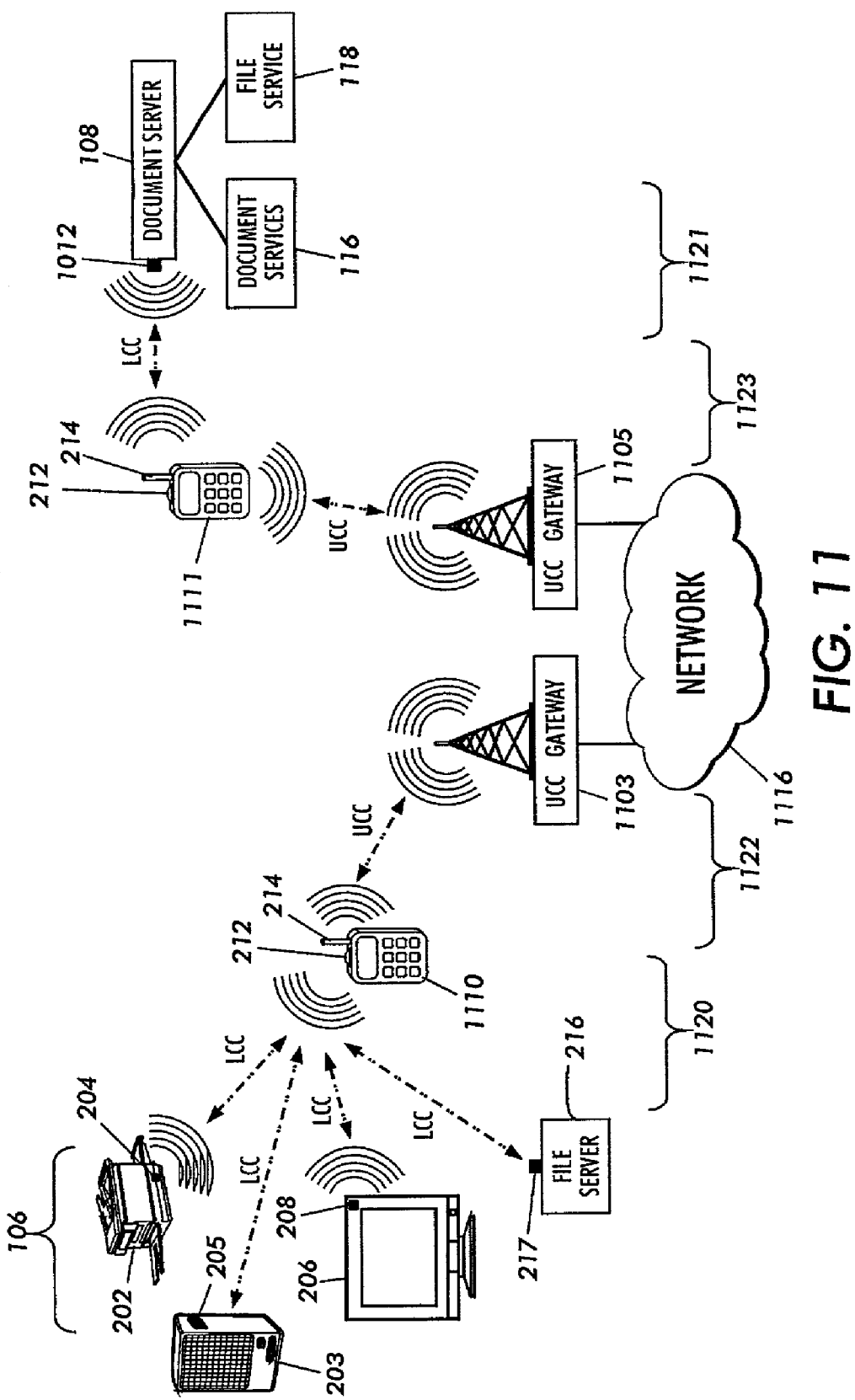
FIG. 11 illustrates yet another embodiment in which two mobile computing devices communicate over an unlimited communications channel while each mobile computing device communicates with either an output device or a document server (which may be integral in or coupled to an input device) over respective limited communications channels.

FIG. 111 illustrates yet another embodiment which includes a first mobile computing device 1110 and a second mobile computing device 1111. Each of the mobile computing devices 1110 and 1111 operate a first communications channel 1120 and 1121, respectively, over a limited communications channel (LLC). In the example shown in FIG. 11, the first mobile computing device 1110 communicates with output devices 106 over its limited communications channel 1120 while the second mobile computing device 1111 communicates with document server 108 over its limited communications channel 1121.

In addition, each of the mobile computing devices 1110 and 1111 operate a second communications channel 1122 and 1123, respectively, over an unlimited communications channel (UCC). The two unlimited communications channels 1122 and 1123 are used to couple the two mobile computing devices 1110 and 1111 through gateways 1103 and 1105, respectively, of network 1116. In effect, the mobile computing device 1110 forms a limited communications channel with the output device 106 and an unlimited communications channel with the mobile computing device 1111, which then forms a limited communications channel with the document server 108.

In one instance, the additional mobile computing device 1111 acts as a router to route communications received over the unlimited communications channel 1123 to the limited communications channel 1121. That is, once a connection is established between the document server 108 and the output device 106 via the two mobile computing devices 1110 and 1111, document data is routed from the source to the destination. In performing the routing, the two mobile computing devices 1110 and 1111 handle communication protocol conversions between limited communications channels and unlimited communications channels as necessary.

It will be appreciated by those skilled in the art that the operations performed by the first mobile computing device 1110 and the second mobile computing device 1111 could be interchanged so that the service is initiated and controlled by the second mobile computing device 1111. It will also be appreciated that some of the services in this embodiment must be performed at one of the two mobile computing devices 1110 and 1111, such as discovery requests for identifying available output devices. Communication between the first mobile computing device 1110 and the second mobile computing device 1111 may be initiated and carried out in a number of ways, including: exchanging messages using for example SMS (Short Message Service) messaging, setting up a direct connection, or by direct dialing.

It will be further appreciated by those skilled in the art that the first mobile computing device 1110 and the second mobile computing device 1111 may have a master/slave relationship so that one device controls the other. Alternatively, the mobile computing devices may share control thereby enabling each device to exercise full or a limited amount of control over the transmission discovery, preparation, and control of document service requests. Generally, either of the mobile computing devices 1110 or 1111 may initiate the document service request. However, it is preferred that the mobile computing device initiating the document service request always remains in full control of the transaction, irrespective of the amount of control given to the other mobile computing device.

D. Operating in the Original Token-Based Environment

Figure 12:
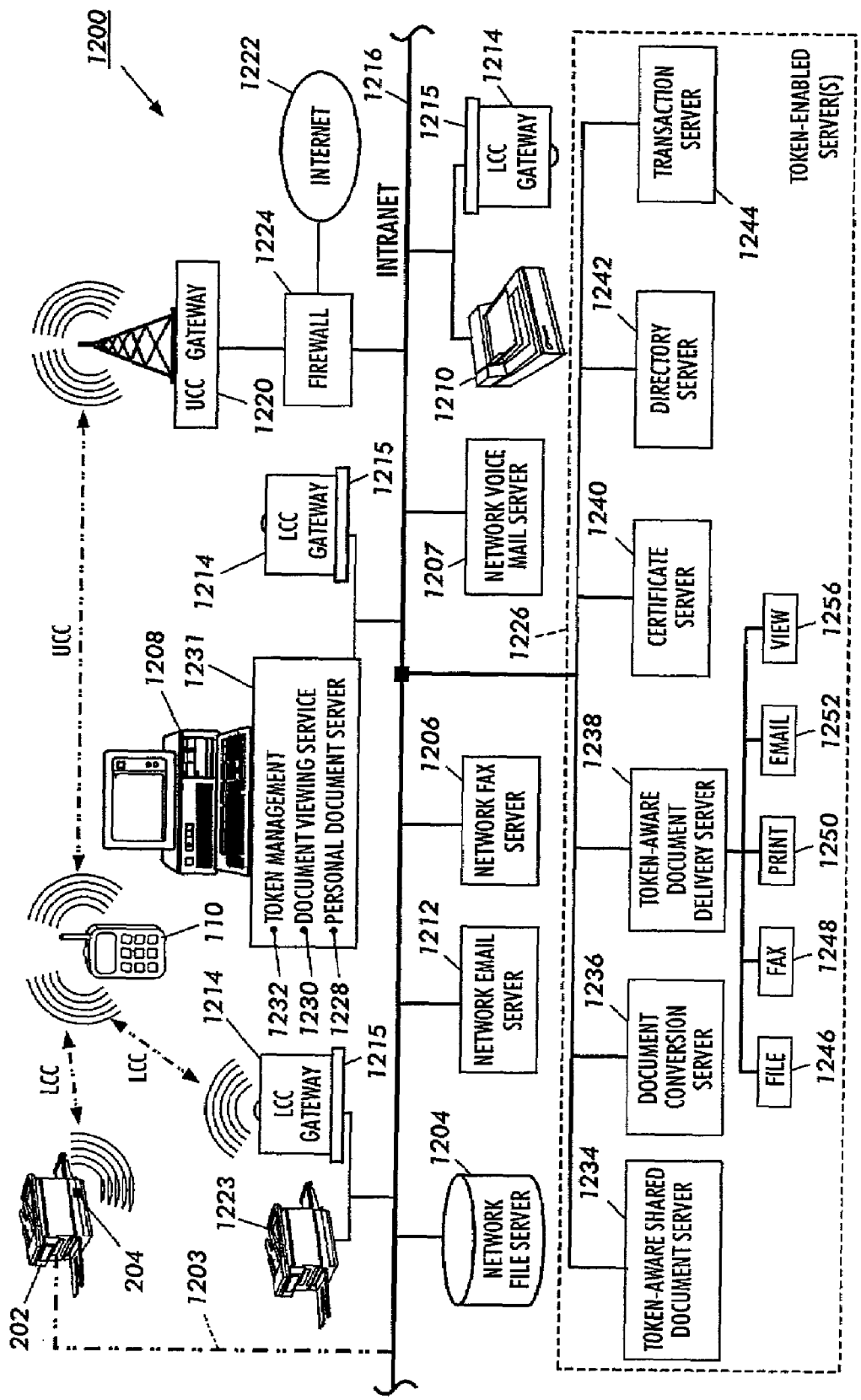
FIG. 12 illustrates the original token-based environment with an enhanced mobile computing device operating therein to couple thereto devices with no adequate preexisting connectivity (e.g., standalone devices)

FIG. 12 illustrates the original token-based environment 1200 with the (token-enabled) mobile computing device 110 enhanced with the methods set forth in section C above operating therein. The original token-based environment 1200 included a plurality of network devices for providing document services. These network devices, which are coupled to wire-based networks 1216 and 1222, include a printer 1223, a file server 1204, a network fax server 1206, a personal workstation 1208, a scanner 1210, and a network email server 1212. Generally, these as well as other network devices not shown communicate using intranet 1216 and gain access to Internet 1222 through firewall 1224. The network devices communicate over the wire-based networks 1216 and 1222 using well-known network communication protocols such as TCP/IP.

In addition, the enhanced mobile computing device 110 is bridged to the wire-based networks 1216 and 1222 through either LCC gateways 1214 or UCC gateway 1220. The LCC and UCC gateways are adapted to convert an LCC and UCC data stream, respectively, into a data format suitable for transmission over the wire-based networks 1216 and 1222. The enhanced mobile computing device 110 communicates with other wire-based or wireless devices using either the LCC transceiver or the UCC transceiver integrated therein. An example of such a mobile computing device is a Nokia® Communicator, which is one of a series sold by the Nokia Company. The UCC is provided using an UCC transceiver that operates over any one of a plurality of suitable wireless network such as PCS, GSM, or pager messaging. The LCC is provided using an IR transceiver that uses, for example, IrDA communication standards.

To seamlessly integrate document services across wireless and wire-based networks, the wire-based network is further populated with token-enabled server(s) 1226, personal token-enabled workstation elements 1231, and LCC gateway context insertion slivers 1215. These elements operate together in the distributed operating environment to provide users of the enhanced mobile computing device 110 with access to document services available on wire-based networks 1216 and 1222. A user of the enhanced mobile computing device 110 is capable of browsing through directories of document tokens. These document tokens represent the user's documents stored on wired-based networks 1216 or 1222. Each document token specifies at least a location of a document. Also, each document token may include a digital signature and other document parameters such as metadata. By using a mobile computing device, the user is able to invoke document services available on networks 1216 or 1222 to selected document tokens.

In addition, the distributed operating environment 1200 includes standalone devices such as the stand-alone printer 202. As set forth above, the stand-alone printer 202 communicates with the enhanced mobile computing device 110 device information that identifies or is used to identify document services available at the non token-enabled device 202. A non-token enabled device is one that is not adapted to perform a service in response to receiving a document identifier (or token). Advantageously, as described above the enhanced mobile computing device 110 is adapted to integrate the non token-enabled device 202 into the token-enabled operating environment 1200. That is, the enhanced mobile computing device 110 can access the services of the non token-enabled device 202 without requiring hardware or software modifications to the non token-enabled device 202. In effect, the enhanced mobile computing device 110 token-enables the non token-enabled device 202 independent of the device itself, thereby simplifying the integration of non token-enabled devices in the token-enabled operating environment 1200.

In operation as set forth above, the enhanced mobile computing device 110 communicates over an LCC communications channel with the non token-enabled device 202 to provide information that identifies services available at (or performed by) the non token-enabled device 202 to which the enhanced mobile computing device 110 may be proximately positioned. Upon receipt of the information that identifies the services available at the non token-enabled device 202, the document services offered by the non token-enabled device 202 may then be readily accessed by the enhanced mobile computing device 110 within the distributed operating environment 1200.

It will be appreciated by those skilled in the art that the non token-enabled device 202 may be operatively coupled to network 1216 by an inadequate connection as illustrated by dotted line 1203 depending on the particular service provided by the device 202. For example, the printer may or may not be network enabled. In addition, it will be appreciated that in the non token-enabled device may communicate with the enhanced mobile computing device 110 over a limited communications channel that is a low power RF communications channel that uses for example the Bluetooth™ communication protocol.

The token-enabled server 1226, which operates on the wire-based networks 1216 and 1222, communicates with network devices indicated by reference numbers 1223, 1204, 1206, 1208, 1210, and 1212, as well as, the UCC and LCC gateways 1214 and 1220. The token-enabled server 1226 includes token-aware services or servers 1234, 1236, 1238, 1240, 1242, and 1244. These token-aware services can either operate centrally on token-enabled server 1226 or individually on servers distributed over intranet 1216 or Internet 1222. The services provided by the token-enabled server(s) 1226 are shared between users of the enhanced mobile computing devices.

Transmissions from the enhanced mobile computing device 110 are routed through one of the gateways 1214 or 1220 to transaction server 1244. The transaction server 1244 is adapted to manage transaction requests from a plurality of mobile computing devices that involve requests for document services available on networks 1216 and 1222. The directory server 1242 maintains a database of token-enabled devices (e.g., printer 1223 and scanner 1210). In addition, the directory server 1242 may maintain a database (e.g., lookup table between name and available service(s)) of non token-enabled devices (e.g., printer 202). The transaction server 1244 communicates with the directory server 1242 to look up parameters for satisfying document delivery requests from the enhanced mobile computing devices.

In accordance with the invention, the transaction server 1244 is adapted to communicate with the enhanced mobile computing device 110 to provide the functions of the document server 108 (shown in FIGS. 1-3 and 10-11) discussed above in sections A-D. These functions may in whole or in part be provided by the document conversion server 1236 and network file server 1204.

In addition, the transaction server 1244 may communicate with the token-aware document delivery servers 1238 and 1228. The token-aware document delivery servers 1238 and 1228 accept document tokens and retrieve the document that a token represents. Document tokens reference documents stored on the token-aware shared document server 1234, the token-aware personal document server 1228, or other file servers located on the intranet 1216 and the Internet 1222 (e.g., network file server 1204). Effectively, any mobile computing device 110 can communicate either directly or indirectly with the token-aware document servers 1234 and 1228.

One purpose of the token-aware document servers 1234 and 1228 is to function as an interface between token-enabled devices and services and non token-enabled file servers. That is, the token-aware document servers 1234 and 1228 are used to access a document identified in a document token when that document is stored on a file server that is not token-enabled. Examples of file services that are not token-enabled include the Windows NT file service (a product of Microsoft Corporation) and the NFS (Network File System) file service.

A document token is a superset of a document reference (e.g., URL) because document tokens include security elements for authentication. In addition, document tokens may also reference documents on any standard web server operating on intranet 1216 or Internet 1222. It will be appreciated by those skilled in the art, however, that a standard web server does not recognize secure token transactions, and therefore the standard web server disregards any security elements of tokens. An example of a token-aware document server which supports secure token transactions is disclosed in U.S. Pat. No. 6,397,261 (entitled "Secure Token-Based Document Server").

If necessary, the token-aware document delivery server 1238 requests that the conversion server 1236 convert retrieved documents into an appropriate format. The conversion server 1236 converts documents between a number of different document formats such as Microsoft Word, Postscript, and bitmap formats. Interchanging documents between various different formats is known as disclosed, for example, in U.S. Pat. No. 5,210,824.

After retrieving and formatting a document referenced by a document token, the token-aware document delivery server 1238 delivers the formatted document to a driver for preparing the document referenced by the document token in a device dependent format. The drivers available on the token-aware document delivery server 1238 include a filing driver 1246, a fax driver 1248, a print driver 1250, an email driver 1252, or a viewing driver 1256. For example, the token-aware document delivery server contains an appropriate print driver for rending a print ready document for a specific printer.

The network gateways 1214 and 1220, the transaction server 1244, the token-aware document delivery server 1238, and the token-aware document servers 1234 and 1228 communicate with the certificate server 1240 which stores a list of public keys of users. In requesting a public key from the certificate server 1240, a requesting token-enabled server submits a hint of a user's public key. In return, the certificate server 1240 supplies a certificate, which contains the user's public key as well as a well-known public key that can be used to authenticate the certificate. In addition, the certificate server 1240 may support standard certificates such as the X509 certificates from Verisign Incorporated.

The difference between a token-aware shared document server 1234 and a token-aware personal document server 1228 is that the shared document server 1234 is capable of authenticating requests to fetch documents identified in document tokens using many different key pairs. In contrast, the personal document server 1228 may only authenticate requests with one or two key pairs, such as a device key from the enhanced mobile computing device 110 and the personal workstation 1208.

Operating on personal workstation 1208 are token-enabled personal workstation elements 1231, which include a document token management service 1232, a token-aware document viewing service 1230, and a token-aware personal document server 1228. Any combination of these elements may operate on one or more personal workstations 1208. The token-aware personal document server 1228 provides users operating a mobile computing device 110 with access to documents stored on the particular workstation operating on networks 1216 or 1222. The token-aware document viewing service 1230 provides a user of mobile computing device 110 with the capability of beaming document tokens to the personal workstation 1208 and viewing the documents referenced by the document tokens. The document token management service 1232 provides a facility for creating document tokens for documents stored, for example, on personal workstation 1208 or network file server 1204.

In accordance with the original token-based environment, the token-enabled server 1226 can also offer a plurality of document services to a user of the enhanced mobile computing device 110 to be directed through either LCC gateway 1214 or UCC gateway 1220. When the LCC gateway 1214 receives a document transaction service request from a proximately located mobile computing device 110, the LCC gateway 1214 forwards the request to the transaction server 1244 over intranet 1216. The LCC gateway can either be embedded in or be intimately associated with a device that offers document services. For example, the printer 1223 shown in FIG. 12 is intimately associated with an LCC gateway 1214.

Before forwarding the document service request in the original token-based environment, the LCC gateway context insertion sliver 1215 authenticates the request using the certificate server 1240 and appends location context information to the request. The location context information allows the token-enabled server 1244 to determine which gateway forwarded a particular request document service request. This permits the token-enabled operating environment to offer user context-sensitive services. Document service requests that arrive either from UCC gateway 1220 or Internet 1222 are authenticated at firewall 1224.

Advantageously, the enhanced mobile computing device 110 is adapted to either directly control a document service request as described above in sections A-D or simply initiate a document service request as provided in the original token-based environment. It will be appreciated by those skilled in the art that the method used to carry out a document service request can be performed with or without the knowledge of the user of the enhanced mobile computing device. In addition, it will be appreciated that the method used to carry out a document service request will depend on the best form of connectivity that can be established between the output device and the token-enabled server 1226.

E. Alternate Operating Environments

Figure 13:
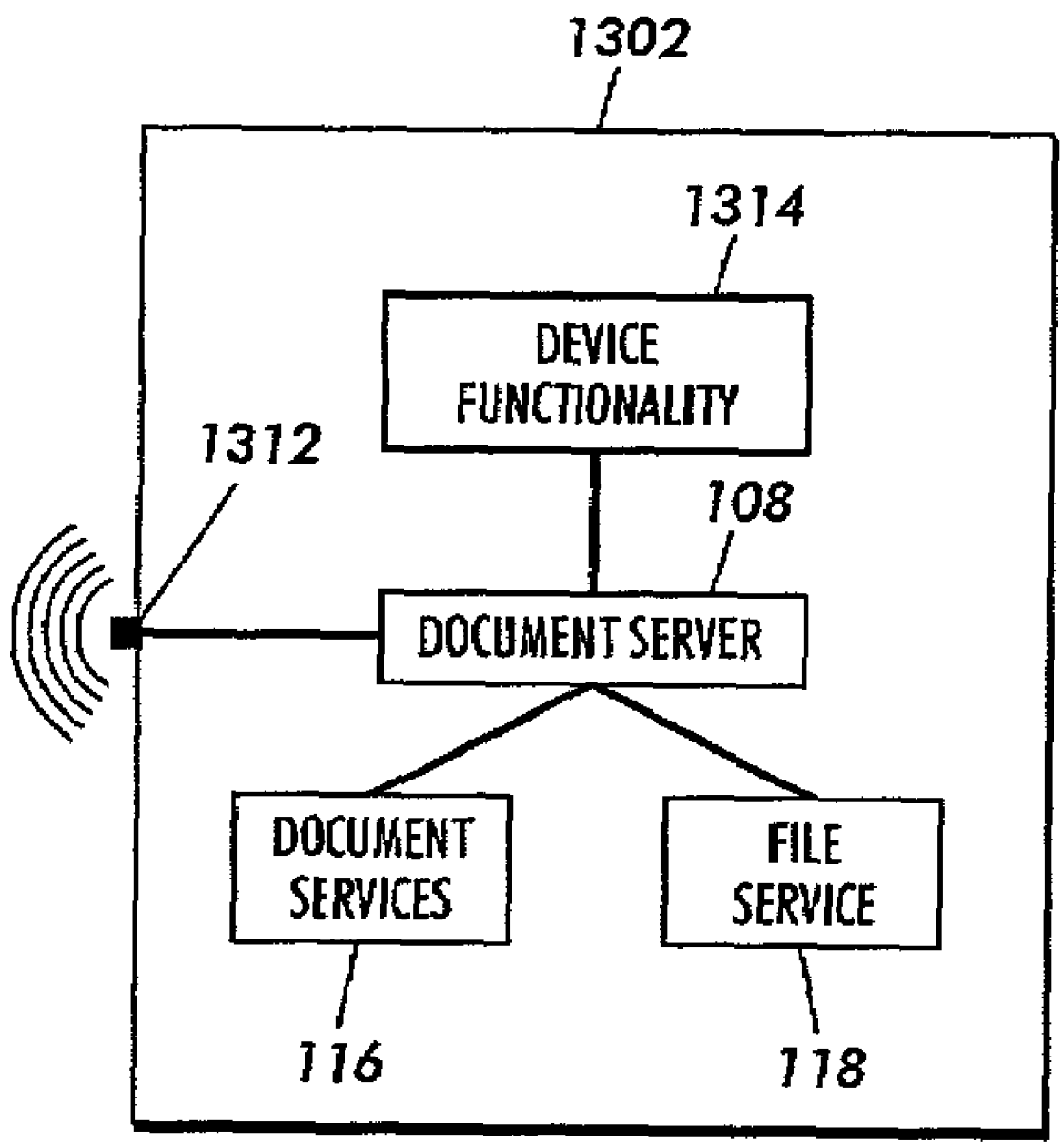
FIG. 13 illustrates an alternate embodiment in which the document server, the conversions service, the file service, and device functionality are integrally coupled together in an input device.

FIG. 13 illustrates an alternate embodiment of the invention in which the document server 108, the document services 116, the file service 118, and device functionality 1314 are integrally coupled together in an input device 1302. In the embodiment shown, the document server 108 in the input device 1302 communicates with a mobile computing device using LCC transceiver 1312 in the manner shown in FIG. 10 or 11. The device functionality 1314 of the input device 1302 may for example record image data, voice data, or sensor data. The input device 1302 may therefore be, for example, an image-recording device (e.g., a digital camera, a video camera, a scanner, etc.), an audio-recording device (e.g., a microphone), and a sensor (e.g., temperature sensor, wind sensor, etc.).

In the embodiment shown in FIG. 13, the device functionality 1314 makes the document server 108 aware of recorded image data, sensor data, or voice data. In yet another embodiment not shown, the input device may be formed using a computer enabled with an LCC transceiver, document server, conversion service, and file service that is coupled to an input device, such as a camera or scanner. In one instance, the file service 118 in this embodiment may include file storage that is temporary and limited, providing only enough memory to act as a file buffer. However, the file service 118 may alternatively readily include sufficient file storage for recording a significant number of data files.

Figure 14:
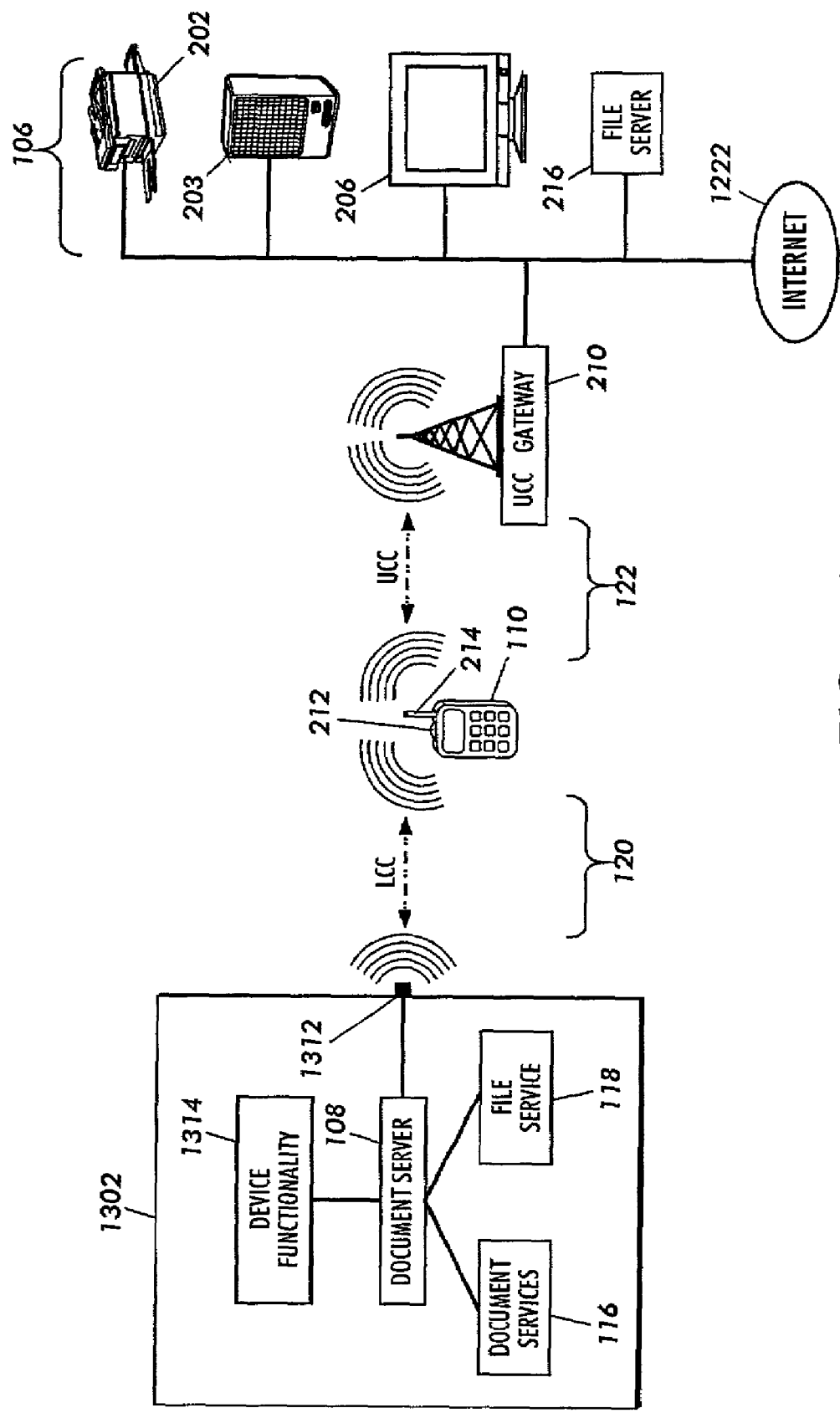
FIG. 14 illustrates an alternate embodiment in which the input device shown in FIG. 13 communicates over a limited communications channel with the mobile computing device, which in turn communicates over an unlimited communications channel with output devices.

FIG. 14 illustrates an alternate embodiment in which the mobile computing device 110 communicates over a limited communications channel with the input device 1302 (shown in FIG. 13) using a first communications channel 120. In addition, the mobile computing device 110 communicates over an unlimited communications channel with an output device 106 using a second communications channel 122 through UCC gateway 210. In this embodiment, the input device 1302 is proximate to the mobile computing device while the output devices 106 may be located remote from the mobile computing device 110, that may possibly be coupled to Internet 1222.

Figure 15:
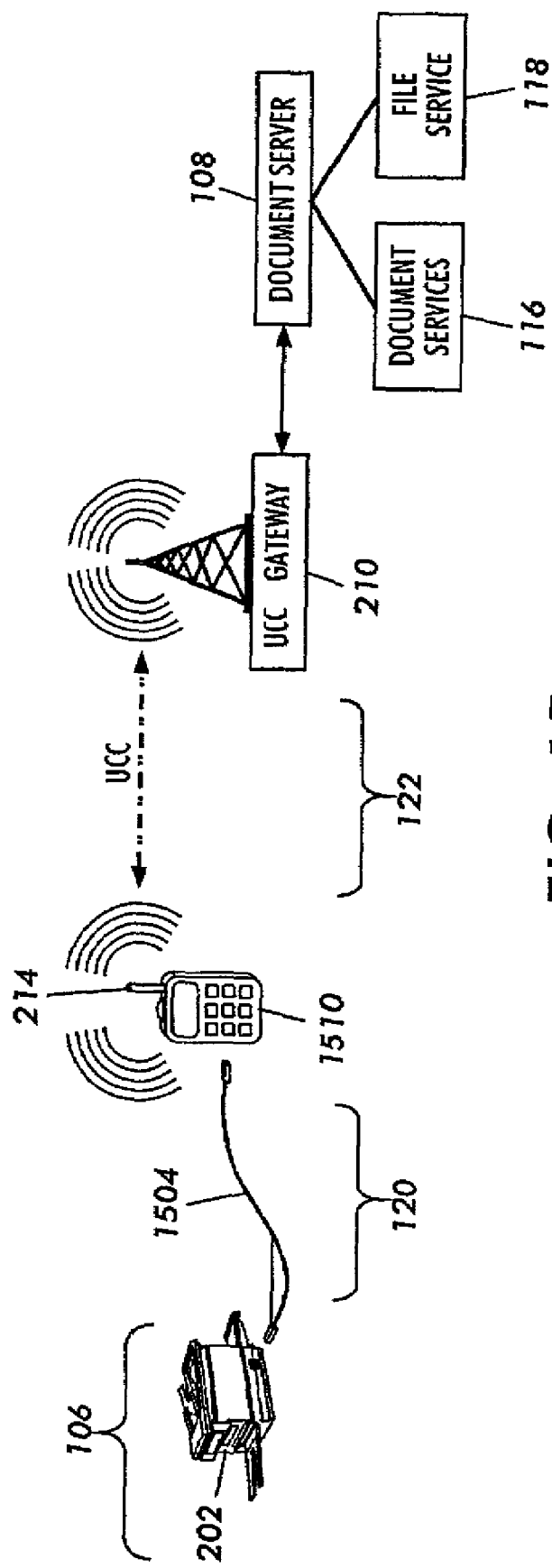
FIG. 15 illustrates an alternate embodiment in which the limited communications channel is physically wired between the mobile computing device and the output device.

FIG. 15 illustrates an embodiment in which the limited communications channel is physically wired (i.e., a wired communications channel) between the mobile computing device 1510 and the output device 106. In this embodiment, the physical wire 1504 between the mobile computing device and the output device provides similar functionality as the first wireless communications channel 120. Depending on the output device 106 and the mobile computing device 1510, the physical wire 1504 between the two devices may have a variety of couplings (e.g., USB, parallel port, serial port, etc.). In the embodiment shown in FIG. 15, the second wireless communications channel 122 operates as described above. In an alternate embodiment not shown, the mobile computing device 1510 communicates with the document server (that is possibly embedded in an input device as shown in FIG. 13) over a wired (limited) communications channel while the output device of a wireless (unlimited) communications channel.

F. Alternate Functional Embodiment

Figure 16:
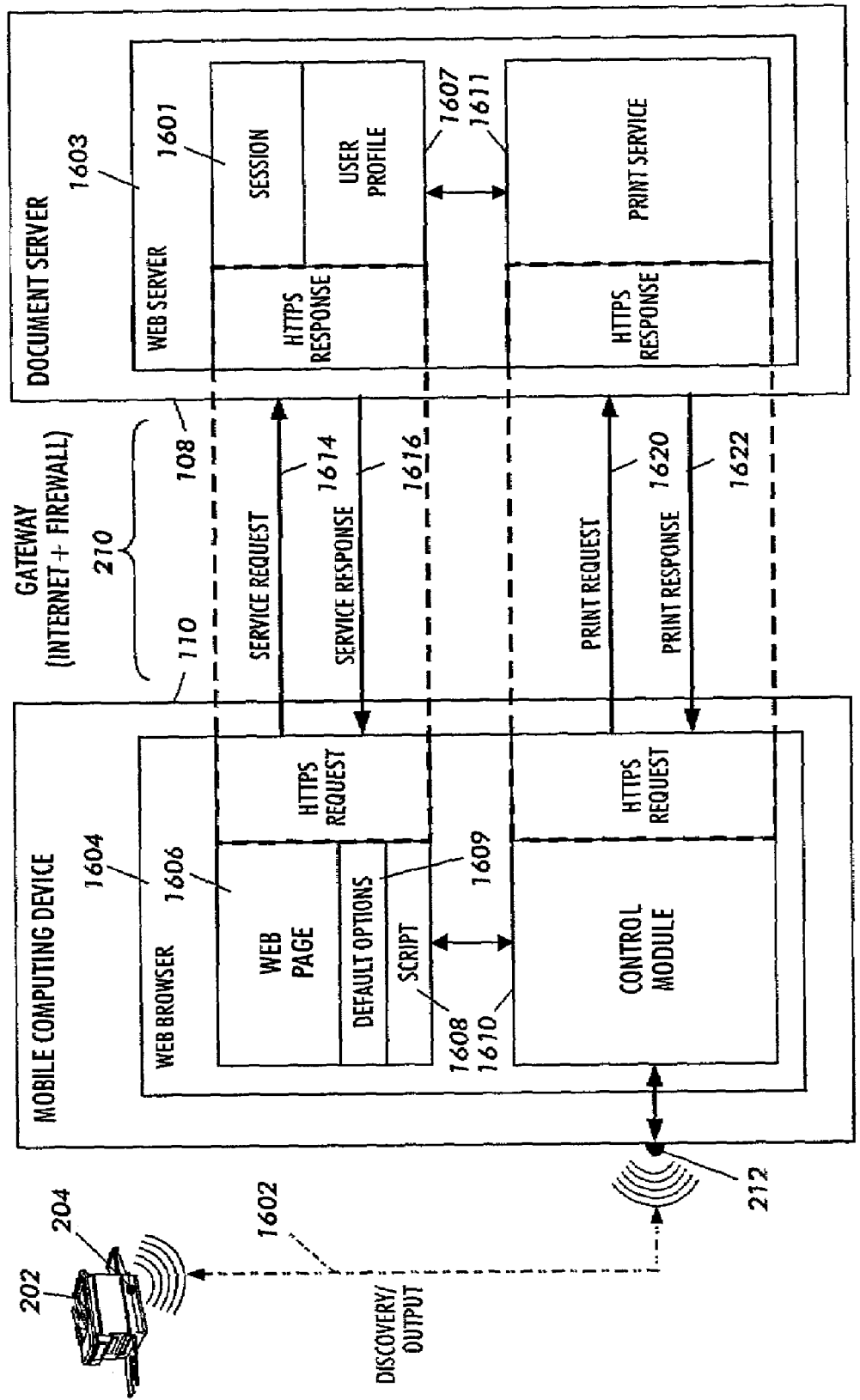
FIG. 16 illustrates a functional diagram of an implementation of an alternate embodiment of the present invention.

FIG. 16 illustrates a functional diagram of an implementation of an alternate embodiment of the present invention. In this implementation, control functions of the user interface for performing the present invention at the mobile computing device are implemented in a program launched by a web browser 1604 on the mobile computing device 110. In the embodiment shown in FIG. 16, the web browser 1604 communicates with a web server 1603 operating on the document server 108.

Figure 17:
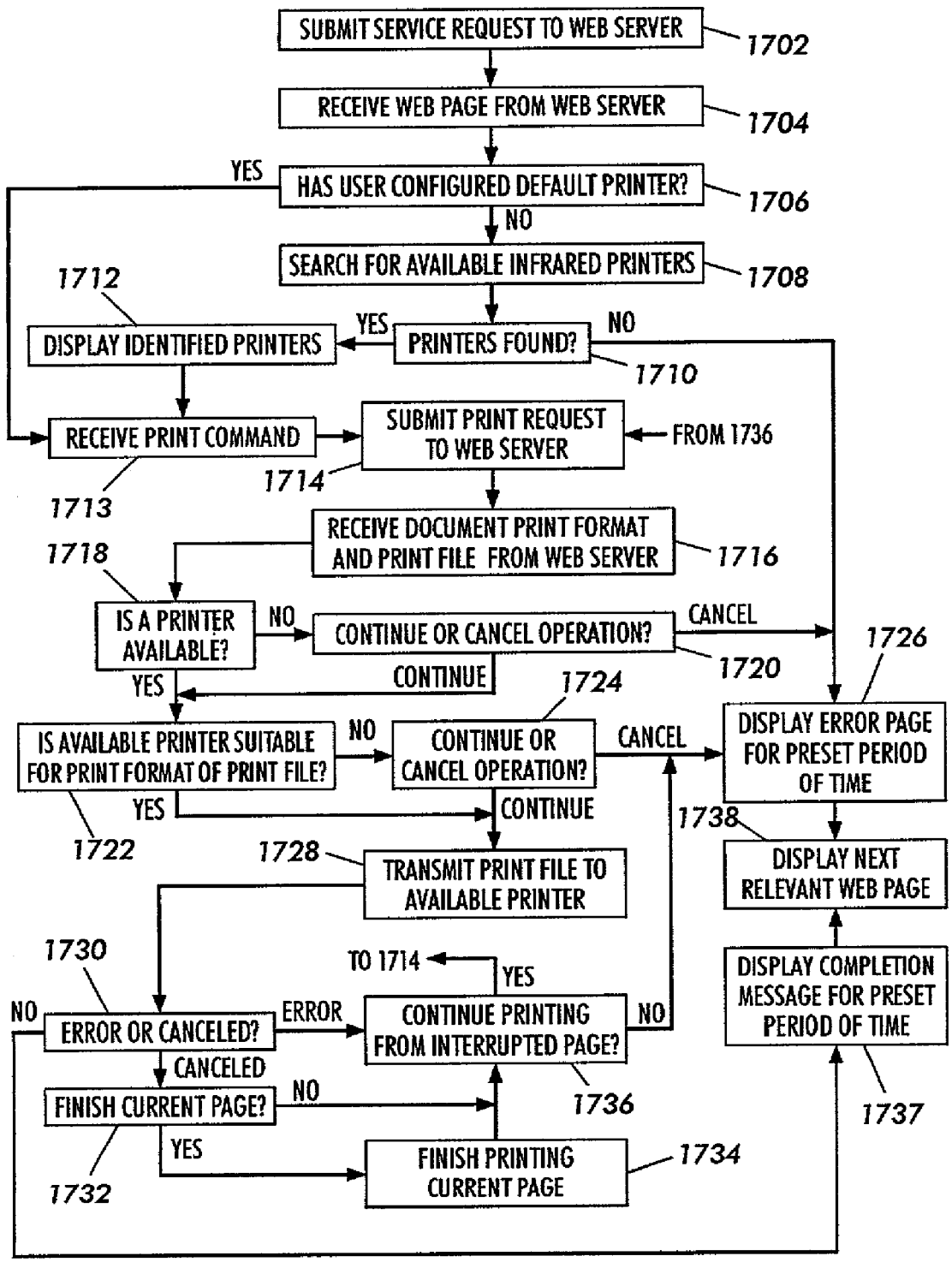
FIG. 17 illustrates a flow diagram of the steps performed at the mobile computing device for carrying out a service request in accordance with the alternate embodiment shown in FIG. 16.
Figure 18:
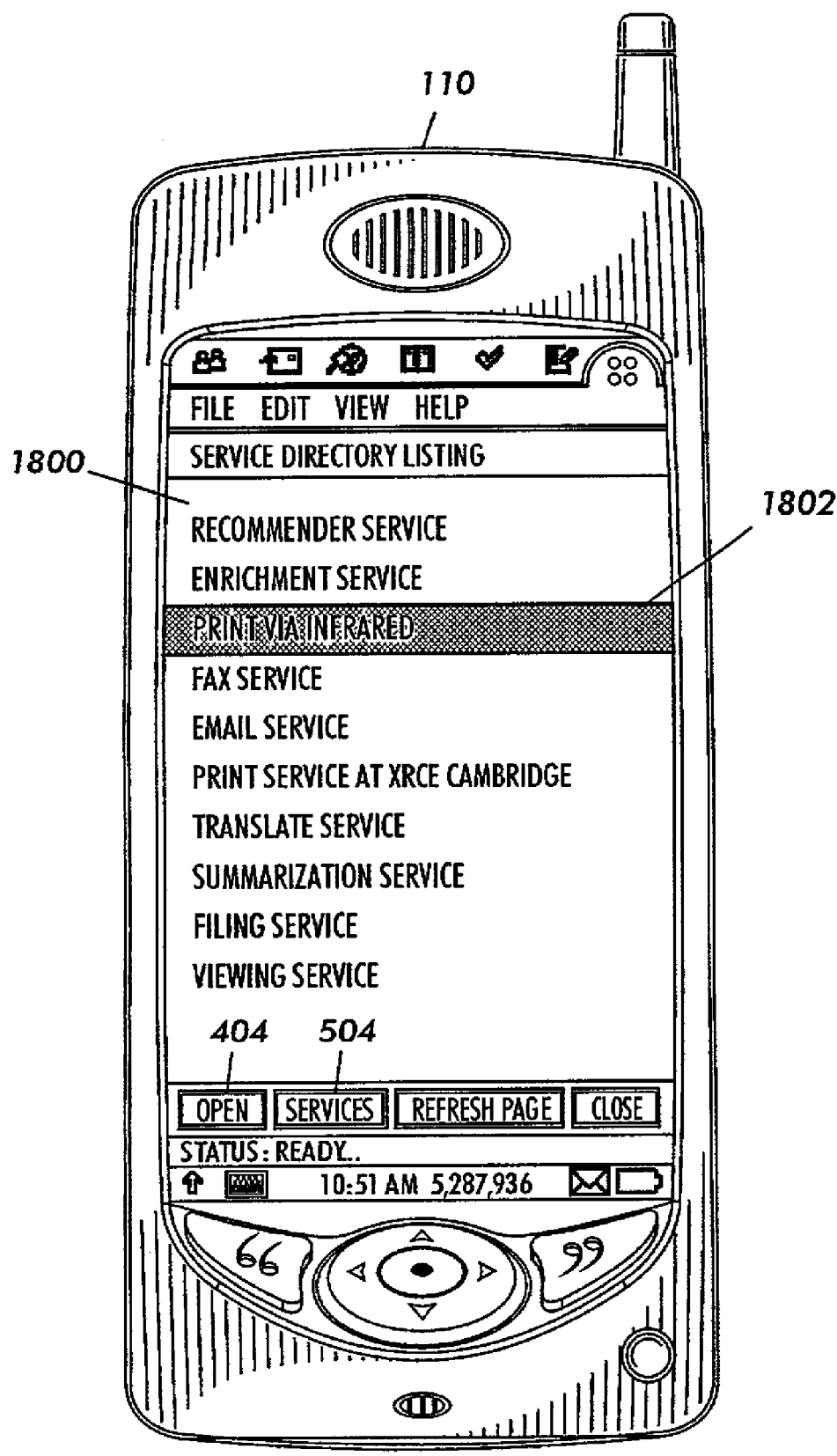
FIG. 18 illustrates an alternate embodiment of the service request shown in FIG. 6.

FIG. 17 is a flow diagram that sets forth the steps performed at the mobile computing device for carrying out a service request in accordance with the functional diagram shown in FIG. 16. To begin a service request, a user of the mobile computing device navigates the web browser 1604 to a web page that provides a list of directory services 1800 for a selected document, as shown in FIG. 18. This can be accomplished, for example, by selecting services button 504.

By selecting the "Print Via Infrared" option in the document services web page 1800 shown in FIG. 18 using "Open" button 404, the mobile computing device submits a service request to the web server 1603 (at step 1702 in FIG. 17). A session 1601 on the web server 1603 of the document server 108 keeps track of the document reference selected for printing (e.g., document reference 502 shown in FIG. 5). Associated with the session 1601 is a user profile 1607 that is used for printer setup. Identifying the user profile 1607 may require that a user log in to start a session on the web server 1603.

In one embodiment, selecting the "Print Via Infrared" service request option at 1802 using the open button 404 initiates an HTTPS (HyperText Transport Protocol Secure) service request 1614 shown in FIG. 16. In an alternate embodiment, an HTTP service request is initiated instead. In this alternate embodiment, the URL (Uniform Resource Locator) defining the HTTP request is directed to a default port number instead of a secure port number to which the HTTPS request is directed.

When the service request 1614 is received at the web server 1603, it is associated with the session 1601 and responded to at 1616 with the appropriate web page 1606 for the service request 1614. The web page 1606 received (at step 1704 in FIG. 17) at the mobile computing device as part of the service response 1616 contains a script 1608 (e.g., using JavaScript, or possibly VBScript) and user default printer options 1609 that are specified in the user profile 1607. Print options stored in the user profile 1607 may include user preferred: orientation, resolution, color settings, page range, and printer name.

After the web browser 1604 loads the web page 1606 in the service response 1616, the script 1608 communicates with a control module 1610. The control module 1610 implements the functions necessary to communicate with the infrared port 212 of the mobile computing device 110. The script 1608, which handles all user interaction at the user interface 1900 shown in FIG. 19, uses methods and event callbacks to communicate with the control module 1610. In one instance, the control module 1610 is an ActiveX control embedded in a web page running using the Pocket Internet Explorer operating system.

In addition, when the web page 1606 corresponding to the service response 1616 is loaded on the mobile computing device 110, a check is made to see whether the control module 1610 needs to be installed or updated. If either an updated or new version of the control module 1610 is required, the web browser 1604 automatically downloads and installs the latest version of the control module 1610. The control module 1610 is digitally signed for security, and the user is automatically prompted by the web browser 1604 to accept the download, if it is configured to do so. After the control module 1610 is initialized, the user default service options 1609 are passed to it by the script 1608.

Referring again to FIG. 19 that illustrates an example user interface 1900 of the web page 1606 embodying the service response 1616 shown in FIG. 16. In the event no default printer name 1901 is specified in the user profile 1607 on the web server 1603 (at step 1706 in FIG. 17), the user is given the ability (i.e., by enabling buttons 1902 and 1904) to search for a wireless printer by selecting "Search" button 1902 or to specify a wireless printer by selecting "Select" button 1904. In response to the "Select" button 1904, the web page 1606 may for example display a directory of printers on the user interface 1900. Other print options besides printer name 1901 are initialized to the values in the user profile 1607 and can be overridden as necessary and reset at 1916 to new values.

When the user specifies that a printer should be searched for by selecting "Search" button 1902, the control module 1610 monitors the infrared port 212 for printers that may be within range (at step 1708 in FIG. 17). When a printer 202 is discovered (at step 1710 in FIG. 17), any available identifying information (e.g., name) is displayed at interface 1900 and the "Print" button 1910 is enabled (step 1712 in FIG. 17). If no printer can be discovered (at 1710 in FIG. 17), then an error page or message is displayed on the user interface 1900 for a preset period of time (at step 1726 in FIG. 17) and the next relevant web page is displayed (at 1738 in FIG. 17).

In one embodiment, even after identifying a printer, the "Search" button 1902 continues to be enabled to allow the user to search for a different printer. In addition in this embodiment, the printer name 1901 is not change, regardless of whether or not the identified printer moves out of range. Once a printer is identified, the user can select the option 1906 to set the current printer as the default in the user profile 1607.

Alternatively, when the "Select" button 1904 is clicked, the user is allowed to manually select a printer profile. Multiple printer profiles may be stored on the document server 108, on the print device 202, or directly on the mobile computing device 110. In either case when button 1904 is selected, a web page (not shown) is initialized with the names of the user or system configured printer profiles. This provides a user of the mobile computing device with the ability to switch between profiles at print time, without the need to reset the default printer for a single print session. In addition, this allows a user to define multiple profiles that specify different formats and print options for the same printer or type of printer.

When a printer name is stored as part of the user profile 1607 (e.g., defined by the user by selecting button 1906) or selected from a directory viewed using button 1904, printer discovery is not performed at step 1710 in FIG. 17. Printer discovery may not be necessary, for example, when a user always or regularly uses the same wireless printer. In the event a printer name is specified as part of the user profile 1607 (at step 1706 in FIG. 17), the service request 1900 is immediately loaded with the default print settings in response to receiving the service response 1616 from the web server 1603 with the web page 1606.

Figure 19:
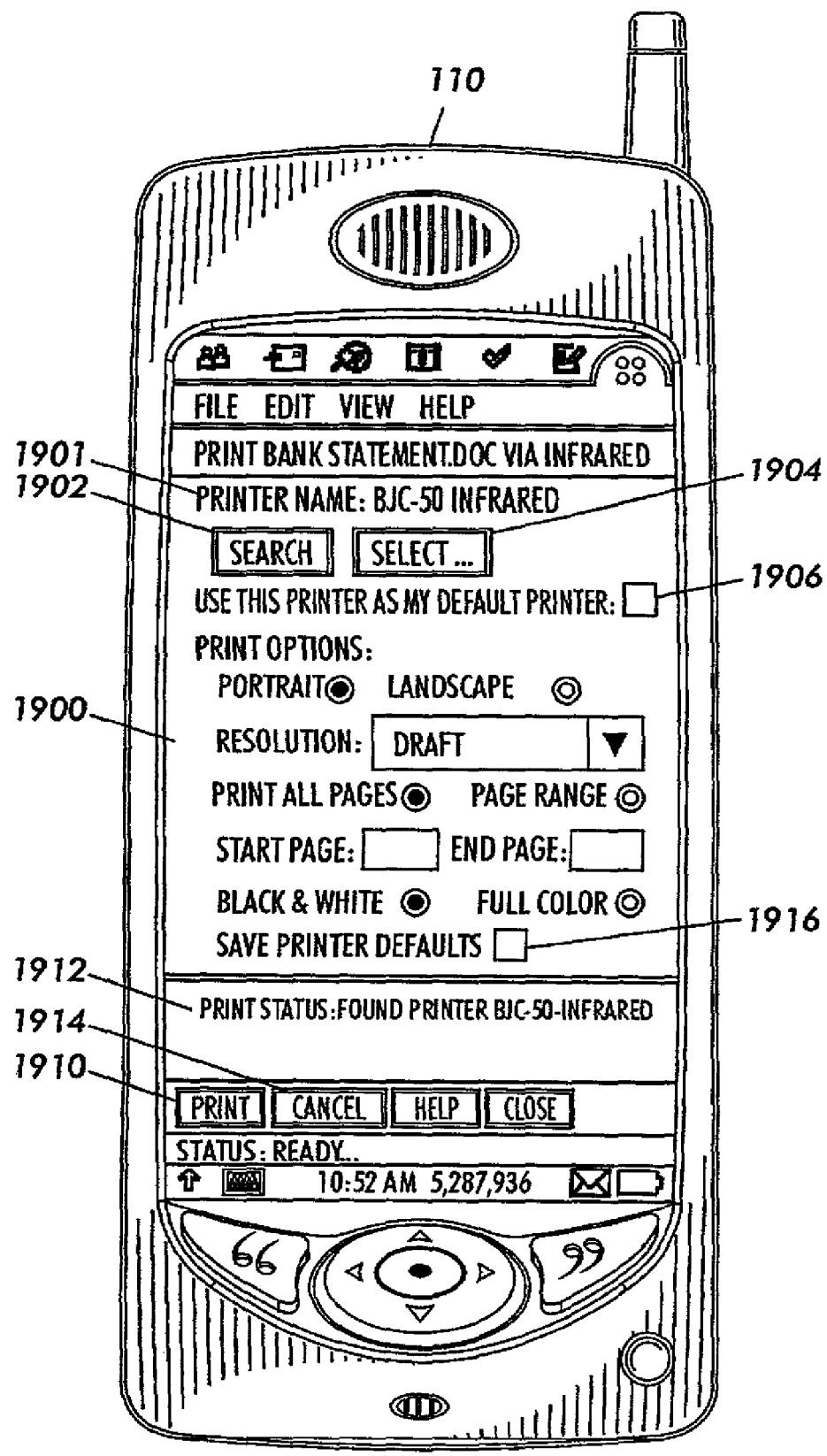
FIG. 19 illustrates an alternate embodiment of a service request for a selected document shown in FIG. 7.

When the user presses the "Print" button 1910 in the user interface shown in FIG. 19 (step 1713 in FIG. 17), the document print request 1620 shown in FIG. 16 is issued to a print service 1611 on the document server 108 by the control module 1610 (step 1714 in FIG. 17). The print request 1620 includes the printer name and any print options that have been changed from the default values received in the service response 1616. Any options that have not changed are determined by the print service 1611 by examining the user profile 1607. If the user has configured a default printer, the print request 1620 is issued automatically using the default settings. In the event no user profile exists on the web server 1603, all print options are specified in the print request 1620.

In response to the print request 1620 by the control module 1610, the print server 1611 issues a print response 1622 that includes print format information and a print file. Once the print file of a selected document reference arrives at the mobile computing device preceded by a printer name string (at step 1716 in FIG. 17), the control module 1610 determines whether the discovered or selected printer is available (at step 1718 in FIG. 17).

If the selected printer is not available (at step 1720 in FIG. 17), an error message is displayed in the print status area 1912 indicating the selected printer is not in range; e.g., "Please align the infrared port of your handheld device with that of the printer BJC-50. Select 'Print' to Continue or 'Cancel' to stop". If the print request is canceled at this point, an error page is displayed for a period of time after which the next relevant web page is display (at steps 1726 and 1738 in FIG. 17).

If the selected printer is available, a determination is made as to whether the print file being received is in a format suitable for the selected printer (at step 1722 in FIG. 17). In one embodiment, the printer name string that was received before the print file is used to make this determination. If it is found by the control module 1610 that the format of the print file is not compatible with the selected and available printer, then a message is displayed to the user in the print status area 1912 indicating the print file is in the incorrect format for the printer (at step 1724 in FIG. 17).

For example, in one embodiment the following error message is displayed in the print status area 1912: "The printer format requested (BJC-50) does not match the printer currently in range (BJC-85). Please do one of the following: Realign to infrared port with the correct printer and Press 'Print', or Press 'Cancel' and try again, or Press 'Print' to proceed anyway (only do this when you know the printer is compatible)." If the print request is canceled at this point, an error page is displayed for a period of time after which the next relevant web page is display (at steps 1726 and 1738 in FIG. 17).

Note that this example error message may occur in the event the user is pointing the mobile computing device to a different printer. Alternatively, this error message may occur if a default printer is used for conversion that is believed not to be compatible with the printer available at step 1718 in FIG. 17. It will be appreciated by those skilled in the art that different error messages will result depending on the type of communications channel used (e.g., low power RF versus IR). Also if more than one printer is in range, the mobile computing device needs to be aligned by the user with the correct printer. When the mobile computing device detects that an incompatible printer has gone out of range while a compatible printer has come into range, the print status area 1912 is updated to reflect this change of status.

In the event the printer is available and the print file is in a suitable format for the printer, the control module 1610 transmits the print file received from the print service 1611 to the printer 202 (at step 1728 in FIG. 17). In one embodiment, the print file is preceded by a header and chunked to indicate page boundaries, with each chunk having its own length header. In this way the control module can count pages as they are output and when the last page is transmitted. Print status information similar to that shown in FIGS. 8 and 9 can be displayed in the print status area 1912.

When printing completes without errors (at step 1730 in FIG. 17), the status information indicating such is displayed to the user for a preset period of time in the print status area 1912 (at step 1737 in FIG. 17). Subsequently, the control module 1610 issues a call back to the script 1608 which closes the current web page 1606 and returns either automatically or by user specification to the previous relevant web page (at step 1738 in FIG. 17). When the previous relevant web page is displayed on the mobile computing device and the control module 1610 is deleted (if necessary) and all interaction with the infrared port 212 ceases.

If the user presses the "Cancel" button 1914 or an error occurs any time after starting transfer of the print file to the printer 202 but before the transfer completes, the print process is interrupted. If the document is printing when the "Cancel" button 1914 is pressed, the user is given the opportunity to finish the current page being printed (at step 1732 in FIG. 17). For example, the user can receive the following question in the print status area 1912: "Finish printing current page?" with the options "yes (select 'Print')" and "no (select 'Cancel')" and "close". If the user selects the option "yes", the page will finish printing before interrupting the job (at step 1734 in FIG. 17); otherwise if the user selects the option "close", printing will continue without interruption.

Alternatively, printing may be interrupted when the connection with the document server 108 is lost. Lost connections may occur because the phone connection is dropped or because a request timed out (e.g., after five minutes of inactivity). In the event an error occurs that causes a communication loss between the mobile computing device 110 and the printer 202 and/or the document server 108, an error message is displayed to the user indicating such in the print status area 1912.

Whatever the reason for the print process to be interrupted, the print process will revert to the print setup phase, giving the user the opportunity to try to continue printing the selected document again from the interrupted page (at step 1736 in FIG. 17). That is, because some data relating to the current page printed may be lost when a print job is interrupted, the print request (modified to reflect the number of pages required) is re-issued to the web server (at step 1714 in FIG. 17). In one embodiment, the following message is displayed in the print status area 1912 once the print process is interrupted: "Printing interrupted because <REASON>. <ADVICE TEXT> and press 'Print' to try again or 'Cancel' to stop." The <REASON> may for example be one of the following: (a) "canceled by user"; (b) "phone connection dropped or connection reset"; (c) "server connection timed out"; or (d) "printer communication error". The <ADVICE TEXT> may for example depend one of the following reasons: (a) "Please ensure that the phone is able to reconnect"; (b) "Please align your device with the printer before a timeout occurs"; and (c) "Please remove any partially printed/jammed pages from the printer before proceeding".

Any information concerning how many pages that have already been printed is displayed only where it is relevant. For example, if the print request is restarted after an interruption, the following message may be included in the print status area 1912 when <n>pages have been identified as having been previously printed: "The system has detected <n>pages were printed. The page range has been adjusted to enabled printing to start again at the correct page".

In an alternate embodiment, the web browser 1604 does not issue a service request 1614. In this alternate embodiment, the service request 1614 is handled entirely at the web browser 1604 by a separate application. This separate application is launched when the user selects the "Print Via Infrared" option 1802 shown in FIG. 18 and follows a similar process to that described above to perform the print request 1620. It will be appreciated that any one of a number of protocols may be used to carry out the requests and responses between the web browser 1604 and the web server 1603 in the different embodiments of the invention described in this section and need not be limited to HTTP or HTTPS.

G. Miscellaneous

To recapitulate, the present invention provides a method and apparatus for routing data directly from a document server to a standalone device, such as a printer, via a mobile computing device. The mobile computing device, such as a mobile phone or a personal digital assistant (PDA), is used to set up a connection and control a connection between the document server and the standalone device, thereby acting as a wireless router (i.e., acts as an initiating and controlling gateway) through which data is transferred.

In order to accomplish the routing, the mobile computing device has sufficient memory to handle buffering of document data. In addition, the mobile computing device may accomplish the routing of document data using a single protocol or multiple protocols (e.g., Bluetooth, HomeRF, 802.11, IrDA, etc.). Furthermore to accomplish the routing of document data, the mobile computing device ensures that the document data produced by a source device (e.g., document server) is in a format suitable for the destination device (e.g., printer). The format may be made suitable partially or entirely at the source device and mobile computing device.

It will be appreciated by those skilled in the art that portions of the system may be readily implemented in software using software development environments that provide portable source code that can be used on a variety of hardware platforms. Alternatively, the disclosed system may be implemented partially or fully in hardware using standard logic circuits.

Whether software or hardware is used to implement the system varies depending on the speed and efficiency requirements of the system and also the particular function and the particular software or hardware systems and the particular microprocessor or microcomputer systems being utilized.

The system, however, can be readily developed by those skilled in the applicable arts without undue experimentation from the functional description provided herein together with a general knowledge of the computer arts.

It will be further appreciated by those skilled in the art that certain of the communications of the mobile communication device 110 may be performed over the LLC or UCC as a point-to-point connection or as a broadcast or as a multicast connection. For example, the mobile communication device in FIG. 2 may simultaneously broadcast or multicast to a plurality of output devices.

In addition it will be appreciated by those skilled in the art that the user interface presented in FIGS. 4-9 is just one of many different embodiments in which a document reference is selected by a user to have a document service performed thereon. In another embodiment not shown, a user receives an SMS (Short Message Service) text message in which a document reference (e.g., URL) is identified at a mobile computing device (e.g., mobile phone). The user subsequently requests a document service to be performed on the identified document reference at the mobile phone.

In accordance with one embodiment of the invention, the mobile computing device forms wireless connections with a standalone printer to identify services available at the printer and a document server to identify and prepare the referenced document for printing at the standalone printer. Application level streaming of the prepared document is provided from the document server through the mobile computing device to the standalone printer. Advantageously, standalone document resources can be readily located and used using the mobile computing device to both set up and control the use of the service.

Furthermore, the present invention provides a mechanism for centralizing services such as the accounting and/or billing of document services used at a mobile computing device. In one embodiment, as a user operates a mobile computing device and uses a document service, the mobile computing device and/or the document server records the transaction, thereby enabling accounting and/or billing for such services.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable storage medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any sub-components or individual parts of one or more processing systems, including software, firmware, hardware, or any combination or sub-combination thereof, which embody the invention as set forth in the l claims.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The invention claimed is:

1. A method for controlling a document service request at a mobile computing device, comprising:

receiving a user selection directed at a first web page displayed by a web browser operating at the mobile computing device; the first web page listing document services that may be applied to a selected document identified by a document reference that is accessible on a document server communicating with a web server;

initiating, at the mobile computing device, the document service request in response to the user selection of a document service from the list of the document services available on the first web page; said initiating adding to the document service request a first parameter identifying the selected document accessible to the document server;

displaying, at the mobile computing device after initiating the document service request, a second web page with the web browser; the second web page, received from the web server, (i) identifying parameters associated with the document service request and (ii) embedding therein a control module for communicating between the document server and an output device;

obtaining, at the mobile computing device using the control module, device information identifying a type of output device available over one of two communications channels;

adding, at the mobile computing device using the control module, the device information as a second parameter to the document service request;

transmitting, from the mobile computing device using the control module, the parameters of the document service request to the document server over one of the two communications channels; and controlling, at the mobile computing device using the control module, a connection between the document server and the output device to transmit there between the selected document in a format suitable for the output device; the mobile computing device establishing the connection with the document server over a first of the two communications channels and with the output device over a second of the two communications channels.

2. The method according to claim 1, wherein the document server and the output device have no preexisting communications channel there between.

3. The method according to claim 1, wherein the document server and the output device have an inadequate preexisting communications channel there between.

4. The method according to claim 1, wherein the document server prepares the document identified by the first parameter in the format suitable for the output device.

5. The method according to claim 4, wherein the suitable format prepared by the document server conforms to at least one format that the output device is adapted to process.

6. The method according to claim 4, wherein the document server applies one of a document enrichment, translation, conversion, summarization, recommender service to the document before preparing the document in the suitable format.

7. The method according to claim 1, wherein the mobile computing device sets up a route between the document server and the output device.

8. The method according to claim 1, wherein the output device is one of a printer, a display, a file server, and a speaker.

9. The method according to claim 1, wherein the format suitable for the output device is a device dependent format.

10. The method according to claim 1, wherein the first of the two communications channels is an unlimited communications channel and the second of the two communications channels is a limited communications channel.

11. The method according to claim 10, wherein the two communications channels are wireless communications channels.

12. The method according to claim 10, wherein the limited communications channel is a wired communications channel and the unlimited communications channel is a wireless communications channel.

13. The method according to claim 1, wherein the first and the second of the two communications channels are limited communications channels.

14. The method according to claim 1, further comprising processing the document service request at the document server by:
   locating the document identified by the first parameter of the document service request;
   loading a driver corresponding to the device information specified in the document service request;
   rendering the located document using the loaded driver;
   storing the rendered document in a print file; and
   transmitting the print file to the mobile computing device over the first of the two communications channels.

15. The method according to claim 1, further comprising applying one or more specified services to the document as part of the document service request; wherein the one or more specified services is one of a summarization service, an enrichment service, a recommender service, and a translation service.

16. The method according to claim 1, further comprising recording the document service request for accounting purposes at the mobile computing device.

17. The method according to claim 1, wherein the mobile computing device transforms the document into the format suitable for the output device.

18. The method according to claim 1, wherein the device information is obtained by executing a discovery request at the mobile computing device.

19. The method according to claim 1, wherein the device information is obtained using a profile of the output device and confirmed by executing a discovery request at the mobile computing device.

20. The method according to claim 1, wherein one of the first of the two communications channels and the second of the two communications channels of the mobile computing device is routed through a second mobile computing device having at least two communications channels.

21. The method according to claim 1, wherein the document server forms part of an input device.

22. The method according to claim 1, wherein device information identifying the type of output device available over the first communications channel is a class of service.

23. The method according to claim 22, wherein the class of service is wireless printing.

24. The method according to claim 1, wherein the first parameter and the second parameter are specified using a name of the document.

25. An article of manufacture, comprising:
   a storage medium; and
   program instructions stored on the storage medium for controlling a document service request on a mobile computing device having a processor; the processor in executing the program instructions:
   receiving a user selection directed at a first web page displayed by a web browser operating at the mobile computing device; the first web page listing document services that may be applied to a selected document identified by a document reference that is accessible on a document server communicating with a web server;
   initiating, at the mobile computing device, the document service request in response to the user selection of a document service from the list of the document services available on the first web page; said initiating adding to the document service request a first parameter identifying the selected document accessible to the document server;
   displaying, at the mobile computing device after initiating the document service request, a second web page with the web browser; the second web page, received from the web server, (i) identifying parameters associated with the document service request and (ii) embedding therein a control module for communicating between the document server and an output device;
   obtaining, at the mobile computing device using the control module, device information identifying a type of output device available over one of two communications channels;
   adding, at the mobile computing device using the control module, the device information as a second parameter to the document service request;
   transmitting, from the mobile computing device using the control module, the parameters of the document service request to the document server over one of the two communications channels; and
   controlling, at the mobile computing device using the control module, a connection between the document server and the output device to transmit there between the selected document in a format suitable for the output device; the mobile computing device establishing the connection with the document server over a first of the two communications channels and with the output device over a second of the two communications channels.

26. A mobile computing device for controlling a document service request, comprising:
   a memory for storing program instructions; and
   a processor for executing the program instructions stored in the memory; the
   processor in executing the program instructions:
   receiving a user selection directed at a first web page displayed by a web browser operating at the mobile computing device; the first web page listing document services that may be applied to a selected document identified by a document reference that is accessible on a document server communicating with a web server;

initiating, at the mobile computing device, the document service request in response to the user selection of a document service from the list of the document services available on the first web page; said initiating adding to the document service request a first parameter identifying the selected document accessible to the document server;

displaying, at the mobile computing device after initiating the document service request, a second web page with the web browser; the second web page, received from the web server, (i) identifying parameters associated with the document service request and (ii) embedding therein a control module for communicating between the document server and an output device;

obtaining, at the mobile computing device using the control module, device information identifying a type of output device available over one of two communications channels;

adding, at the mobile computing device using the control module, the device information as a second parameter to the document service request;

transmitting, from the mobile computing device using the control module, the parameters of the document service request to the document server over one of the two communications channels; and controlling, at the mobile computing device using the control module, a connection between the document server and the output device to transmit there between the selected document in a format suitable for the output device; the mobile computing device establishing the connection with the document server over a first of the two communications channels and with the output device over a second of the two communications channels.

* * * * *